(12) United States Patent
Ohta et al.

(10) Patent No.: US 8,064,160 B2
(45) Date of Patent: Nov. 22, 2011

(54) MAGNETIC HEAD FOR PERPENDICULAR MAGNETIC RECORDING WITH COIL WOUND AROUND POLE LAYER

(75) Inventors: Naoki Ohta, Tokyo (JP); Kenkichi Anagawa, Tokyo (JP)

(73) Assignee: TDK Corporation, Tokyo (JP)

( * ) Notice: Subject to any disclaimer, the term of this patent is extended or adjusted under 35 U.S.C. 154(b) by 1148 days.

(21) Appl. No.: 11/882,029

(22) Filed: Jul. 30, 2007

(65) Prior Publication Data
US 2009/0034121 A1  Feb. 5, 2009

(51) Int. Cl.
*G11B 5/17* (2006.01)
*G11B 5/147* (2006.01)
(52) U.S. Cl. .......... 360/123.05; 360/125.03; 360/123.13
(58) Field of Classification Search .......... 360/123.02–123.06, 125.02–125.03, 360/125.09, 125.1, 125.11, 125.13, 125.14, 360/125.15
See application file for complete search history.

(56) References Cited

U.S. PATENT DOCUMENTS

| | | | |
|---|---|---|---|
| 4,562,503 A * | 12/1985 | Fujioka et al. | 360/123.02 |
| 4,771,350 A * | 9/1988 | Desserre | 360/123.05 |
| 4,985,985 A * | 1/1991 | Das | 29/603.14 |
| 5,255,142 A | 10/1993 | Williams et al. | |
| 5,978,186 A * | 11/1999 | Murata et al. | 360/123.39 |
| 6,292,329 B1 * | 9/2001 | Sato et al. | 360/125.03 |
| 6,667,848 B1 * | 12/2003 | Khizroev et al. | 360/125.16 |
| 6,775,099 B2 * | 8/2004 | Kuroda et al. | 360/125.06 |
| 6,954,331 B2 * | 10/2005 | Crawford et al. | 360/125.3 |
| 7,363,700 B2 * | 4/2008 | Matono | 29/603.16 |
| 7,495,864 B2 * | 2/2009 | Kobayashi | 360/123.1 |
| 7,768,744 B2 * | 8/2010 | Hsiao et al. | 360/125.18 |
| 2006/0132971 A1 * | 6/2006 | Clinton et al. | 360/125 |
| 2008/0316646 A1 * | 12/2008 | Na et al. | 360/123.05 |

FOREIGN PATENT DOCUMENTS

| | | |
|---|---|---|
| JP | A 5-217116 | 8/1993 |
| JP | A 2002-25011 | 1/2002 |
| JP | A 2003-6814 | 1/2003 |

* cited by examiner

*Primary Examiner* — Brian Miller
(74) *Attorney, Agent, or Firm* — Oliff & Berridge, PLC

(57) ABSTRACT

A magnetic head includes a medium facing surface, a coil, and a pole layer that generates a write magnetic field. The pole layer includes: a track width defining portion having a first end located in the medium facing surface and a second end opposite to the first end; and a wide portion connected to the second end. The first end defines the track width. The track width defining portion has a width taken in the track width direction, and the wide portion has a width taken in the track width direction that is greater than the width of the track width defining portion taken in the track width direction. The coil is helically wound only around the track width defining portion of the pole layer, and has a portion located between the medium facing surface and the wide portion.

6 Claims, 17 Drawing Sheets

MAGNETIC HEAD FOR PERPENDICULAR MAGNETIC RECORDING WITH COIL WOUND AROUND POLE LAYER

BACKGROUND OF THE INVENTION

1. Field of the Invention

The present invention relates to a magnetic head for perpendicular magnetic recording that is used for writing data on a recording medium by means of a perpendicular magnetic recording system, and to a head assembly and a hard disk drive each of which includes such a magnetic head for perpendicular magnetic recording.

2. Description of the Related Art

For magnetic read/write devices such as magnetic disk drives, higher recording density has been constantly required to achieve a higher storage capacity and smaller dimensions. Typically, magnetic heads used in magnetic read/write devices are those having a structure in which a reproducing (read) head having a magnetoresistive element (that may be hereinafter referred to as an MR element) for reading and a recording (write) head having an induction-type electromagnetic transducer for writing are stacked on a substrate.

Write heads include those of a longitudinal magnetic recording system wherein signals are magnetized in the direction along the surface of the recording medium (the longitudinal direction) and those of a perpendicular magnetic recording system wherein signals are magnetized in the direction perpendicular to the surface of the recording medium. Recently, the shift from the longitudinal magnetic recording system to the perpendicular magnetic recording system has been promoted in order to achieve higher recording density of magnetic read/write devices.

A write head for the perpendicular magnetic recording system includes a coil for generating a magnetic field corresponding to data to be written on the recording medium, and a pole layer for allowing a magnetic flux corresponding to the magnetic field generated by the coil to pass therethrough and generating a write magnetic field for writing the data on the recording medium. The pole layer has an end located in a medium facing surface, and the width of this end defines the track width.

The pole layer includes, for example, a track width defining portion having a first end located in the medium facing surface and a second end opposite to the first end, and a wide portion coupled to the second end of the track with defining portion and having a width greater than that of the track width defining portion. The track width defining portion has a nearly uniform width. The width of the first end of the track width defining portion defines the track width. The wide portion has two front end faces that are located at outer positions relative to the track width defining portion along the track width direction and that face toward the medium facing surface.

A magnetic head used for a magnetic disk drive such as a hard disk drive is typically provided in a slider. The slider has the medium facing surface mentioned above. The medium facing surface has an air-inflow-side end and an air-outflow-side end. The slider slightly flies over the surface of the recording medium by means of the airflow that comes from the air-inflow-side end into the space between the medium facing surface and the recording medium. The magnetic head is typically disposed near the air-outflow-side end of the medium facing surface of the slider. In a magnetic disk drive, the magnetic head is aligned through the use of a rotary actuator, for example. In this case, the magnetic head moves over the recording medium along a circular orbit centered on the center of rotation of the rotary actuator. In such a magnetic disk drive, a tilt of the magnetic head with respect to the tangent of the circular track, which is called a skew, occurs according to the position of the magnetic head across the tracks.

In a magnetic disk drive of the perpendicular magnetic recording system that exhibits a better capability of writing on a recording medium than the longitudinal magnetic recording system, in particular, if the above-mentioned skew occurs, there arise problems such as a phenomenon in which, when data is written on a specific track, data stored on a track adjacent thereto is erased (that is hereinafter referred to as adjacent track erase), or unwanted writing between two adjacent tracks. To achieve higher recording density, it is required to suppress adjacent track erase. Unwanted writing between two adjacent tracks affects detection of servo signals for alignment of the magnetic head and the signal-to-noise ratio of a read signal.

One of causes of the occurrences of the above-mentioned adjacent track erase and unwanted writing is flux leakage occurring in a portion of the medium facing surface other than the end face of the pole layer. Such flux leakage occurs because of a magnetic flux that leaks from the front end faces of the wide portion to the outside of the pole layer and then reaches the medium facing surface. To prevent the problems resulting from such flux leakage, a possible measure is to reduce the value of current fed to the coil. However, this will cause degradation in write characteristics such as an overwrite property that is a parameter indicating an overwriting capability. On the other hand, if an attempt is made to improve write characteristics, the above-mentioned flux leakage can increase and the problems resulting from the flux leakage will be encountered.

JP 2003-006814A discloses a magnetic head including: a bottom pole; a top pole that is opposed to the bottom pole in a front gap portion with a gap layer disposed in between and that touches the bottom pole in a back gap portion; a pole tip portion that partially touches the top pole and that is opposed to the bottom pole with a write gap layer disposed in between; and a coil. In this magnetic head, the coil is helically wound around the top pole and the pole tip portion. In this magnetic head, however, the coil does not have any portion located between the medium facing surface and the end face of the top pole facing toward the medium facing surface. Because of this, in the magnetic head, a magnetic flux leaking from the end face of the top pole and reaching the medium facing surface is likely to occur. This magnetic head is therefore incapable of sufficiently suppressing the foregoing problems resulting from the flux leakage.

OBJECT AND SUMMARY OF THE INVENTION

It is an object of the present invention to provide a magnetic head for perpendicular magnetic recording that is capable of improving write characteristics while suppressing problems resulting from flux leakage occurring in a portion of the medium facing surface other than the end face of the pole layer, and to provide a head assembly and a magnetic disk drive each of which includes such a magnetic head for perpendicular magnetic recording.

A first to a third magnetic head for perpendicular magnetic recording of the present invention each include: a medium facing surface that faces toward a recording medium; a coil that generates a magnetic field corresponding to data to be written on the recording medium; and a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system.

In the first magnetic head of the present invention, the pole layer includes: a track width defining portion having a first end located in the medium facing surface and a second end opposite to the first end; and a wide portion connected to the second end. The first end defines the track width. The track width defining portion has a width taken in the track width direction. The wide portion has a width taken in the track width direction that is greater than the width of the track width defining portion taken in the track width direction. The coil is helically wound only around the track width defining portion of the pole layer, and has a portion located between the medium facing surface and the wide portion.

In the first magnetic head of the present invention, the maximum outer diameter of the coil taken in the track width direction may be equal to or smaller than the maximum width of the wide portion. The coil may have a portion located in the medium facing surface. The first magnetic head of the present invention may further include a protection film for protecting the medium facing surface.

In the second magnetic head of the present invention, the pole layer includes: a track width defining portion having a first end located in the medium facing surface and a second end opposite to the first end; and a wide portion connected to the second end. The first end defines the track width. The track width defining portion has a width taken in the track width direction. The wide portion has a width taken in the track width direction that is greater than the width of the track width defining portion taken in the track width direction. The wide portion includes a flare portion having an end connected to the second end and having a width taken in track width direction that increases with increasing distance from the medium facing surface. The flare portion has two side surfaces located on opposite sides in the track width direction. The coil is helically wound only around the track width defining portion and the flare portion of the pole layer, and has a portion located between the medium facing surface and the two side surfaces of the flare portion.

In the second magnetic head of the present invention, the maximum outer diameter of the coil taken in the track width direction may be equal to or smaller than the maximum width of the wide portion. The coil may have a portion located in the medium facing surface. The second magnetic head of the present invention may further include a protection film for protecting the medium facing surface.

In the third magnetic head of the present invention, the pole layer includes a flare portion having an end located in the medium facing surface and having a width taken in the track width direction that increases with increasing distance from the medium facing surface. The end of the flare portion located in the medium facing surface defines the track width. The flare portion has two side surfaces located on opposite sides in the track width direction. The coil is helically wound only around the flare portion of the pole layer, and has a portion located between the medium facing surface and the two side surfaces of the flare portion.

In the third magnetic head of the present invention, the maximum outer diameter of the coil taken in the track width direction may be equal to or smaller than the maximum width of the pole layer. The coil may have a portion located in the medium facing surface. The third magnetic head of the present invention may further include a protection film for protecting the medium facing surface.

A first, a second or a third head assembly of the present invention includes: a slider including the first, the second or the third magnetic head of the invention and disposed to face toward a recording medium; and a supporter flexibly supporting the slider.

A first, a second or a third magnetic disk drive of the present invention includes: a slider including the first, the second or the third magnetic head of the invention and disposed to face toward a recording medium that is driven to rotate; and an alignment device supporting the slider and aligning the slider with respect to the recording medium.

In the first magnetic head of the invention or the head assembly or the magnetic disk drive including this magnetic head, the coil is helically wound only around the track width defining portion of the pole layer, and has a portion located between the medium facing surface and the wide portion. A greater part of the magnetic flux corresponding to the magnetic field generated by the coil passes through the track width defining portion located in the space surrounded by the coil. Therefore, according to the invention, it is possible to improve write characteristics while suppressing the occurrence of problems resulting from flux leakage occurring in a portion of the medium facing surface other than the end face of the pole layer.

In the second magnetic head of the invention or the head assembly or the magnetic disk drive including this magnetic head, the coil is helically wound only around the track width defining portion and the flare portion of the pole layer, and has a portion located between the medium facing surface and the two side surfaces of the flare portion. A greater part of the magnetic flux corresponding to the magnetic field generated by the coil passes through the track width defining portion located in the space surrounded by the coil. Therefore, according to the invention, it is possible to improve write characteristics while suppressing the occurrence of problems resulting from flux leakage occurring in a portion of the medium facing surface other than the end face of the pole layer.

In the third magnetic head of the invention or the head assembly or the magnetic disk drive including this magnetic head, the coil is helically wound only around the flare portion of the pole layer, and has a portion located between the medium facing surface and the two side surfaces of the flare portion. A greater part of the magnetic flux corresponding to the magnetic field generated by the coil passes through a portion of the flare portion located in the space surrounded by the coil. Therefore, according to the invention, it is possible to improve write characteristics while suppressing the occurrence of problems resulting from flux leakage occurring in a portion of the medium facing surface other than the end face of the pole layer.

Other and further objects, features and advantages of the invention will appear more fully from the following description.

DETAILED DESCRIPTION OF THE PREFERRED EMBODIMENTS

First Embodiment

Figure 1:
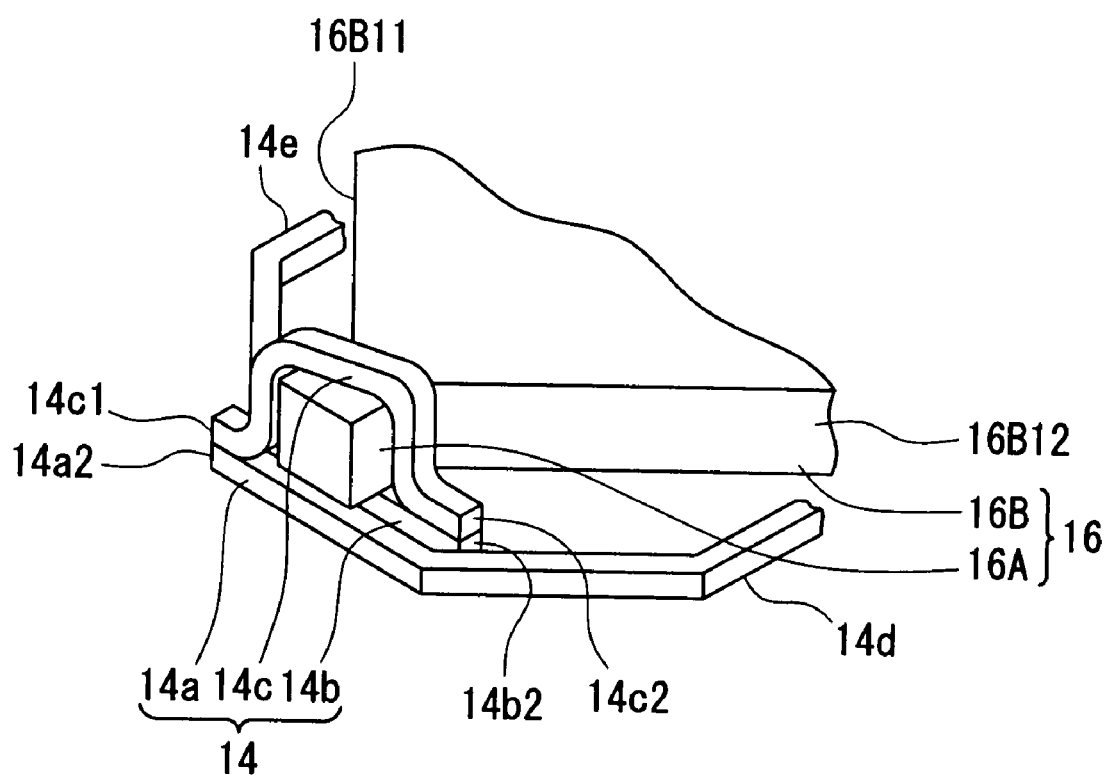
FIG. 1 is a perspective view illustrating a pole layer and a coil of a first embodiment of the invention.
Figure 2:
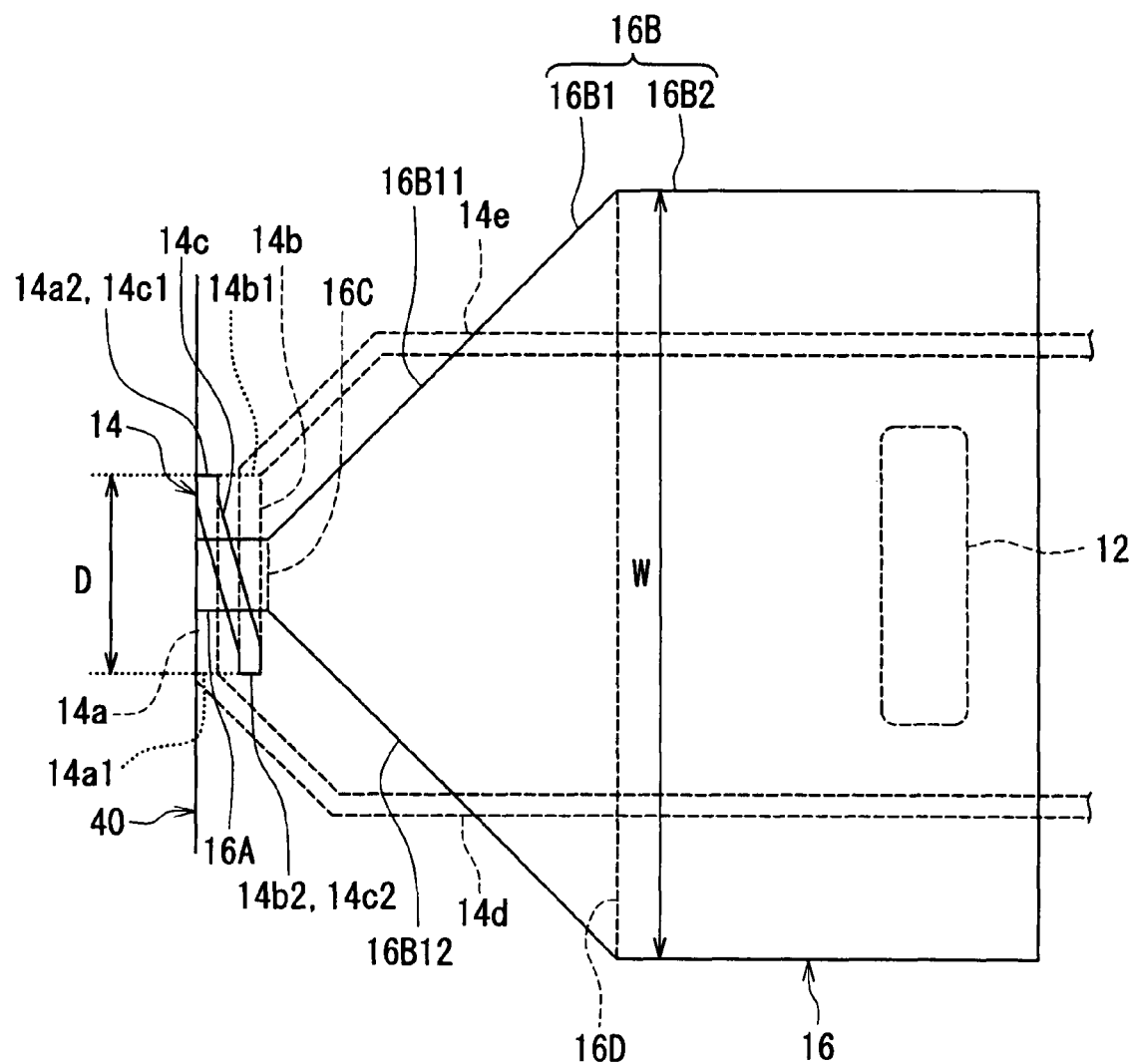
FIG. 2 is a top view illustrating the pole layer and the coil of the first embodiment of the invention.
Figure 3:
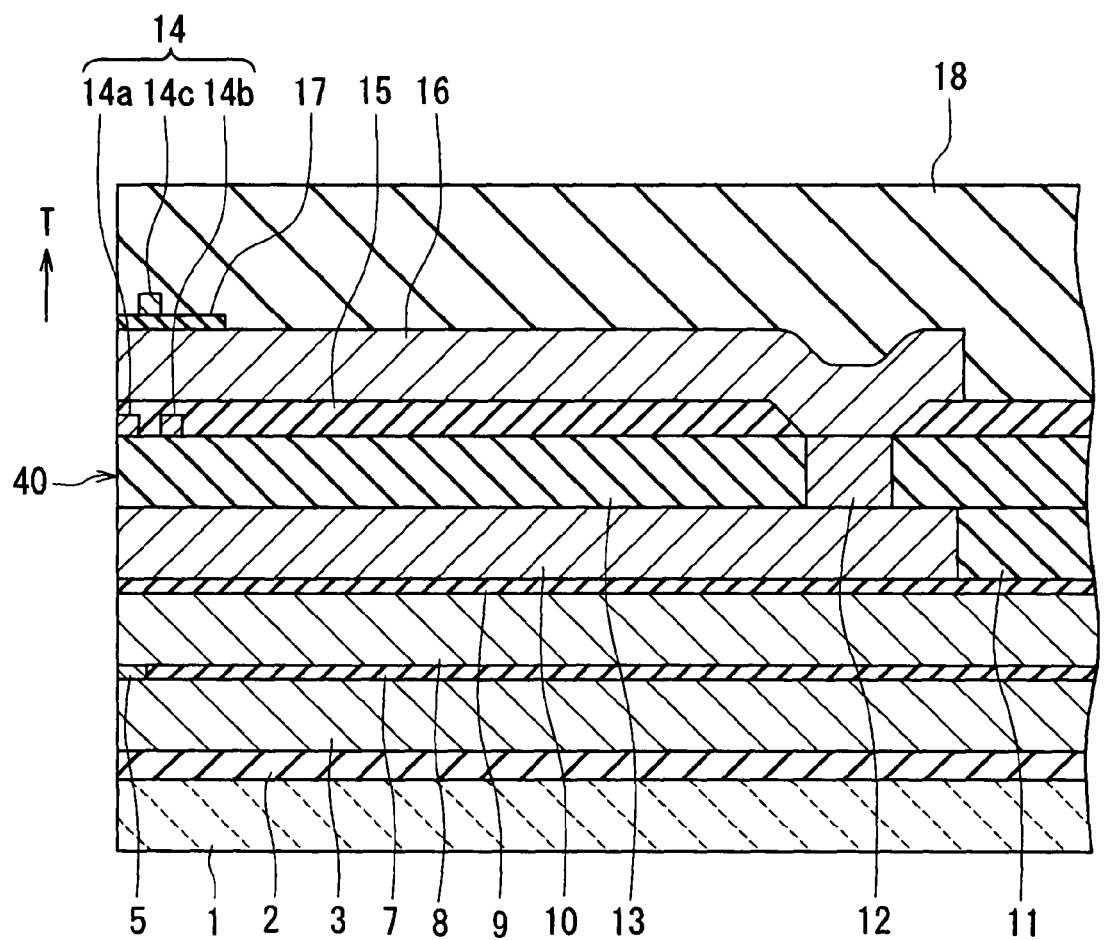
FIG. 3 is a cross-sectional view illustrating the configuration of a magnetic head of the first embodiment of the invention.
Figure 4:
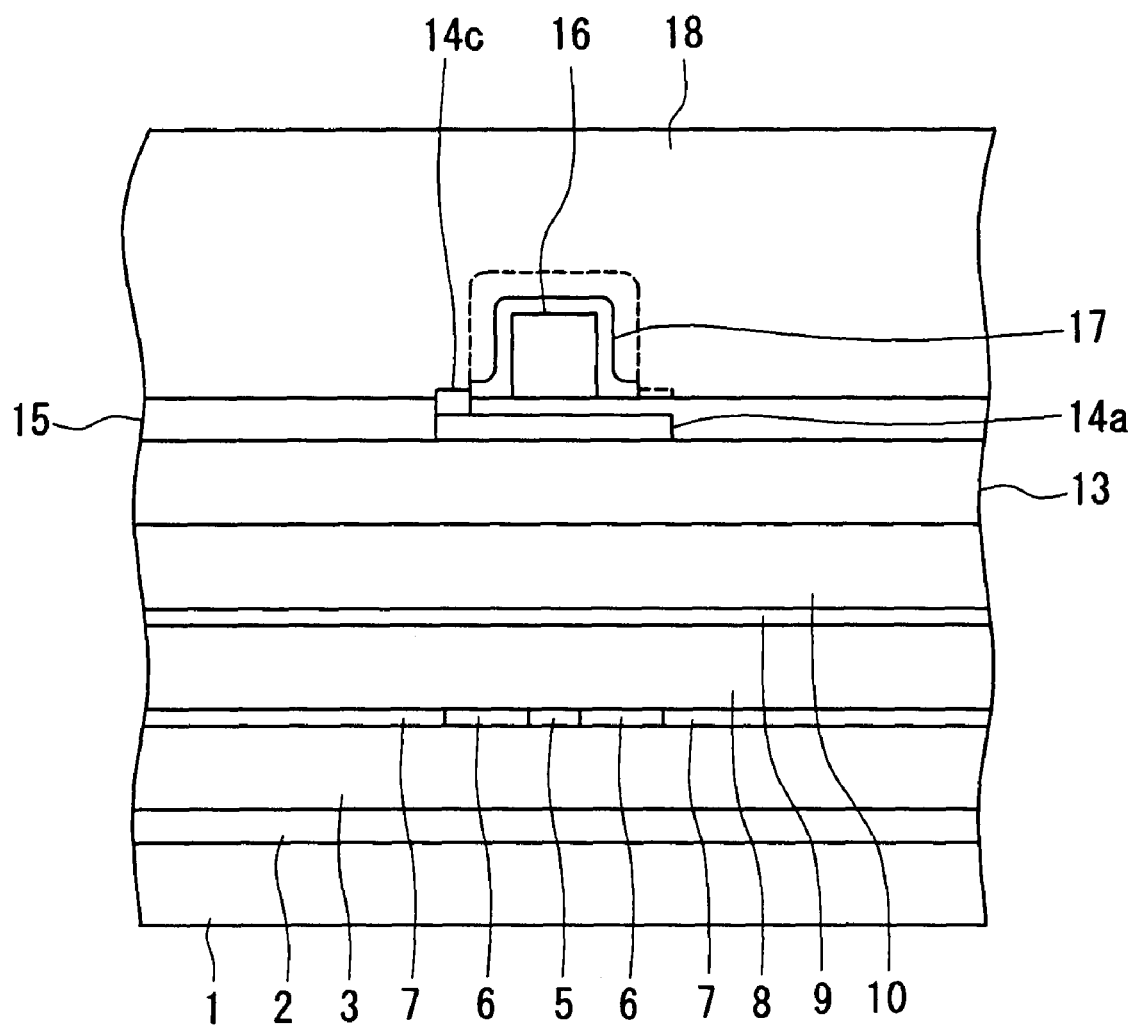
FIG. 4 is a front view of the medium facing surface of the magnetic head of the first embodiment of the invention.

Embodiments of the present invention will now be described in detail with reference to the drawings. First, reference is made to FIG. 1 to FIG. 4 to describe the configuration of a magnetic head for perpendicular magnetic recording (hereinafter simply referred to as a magnetic head) of a first embodiment of the invention. Here is given an example of a magnetic head in which a TMR element utilizing a tunneling magnetoresistive effect is employed as the MR element. FIG. 1 is a perspective view illustrating a pole layer and a coil of the embodiment. FIG. 2 is a top view illustrating the pole layer and the coil of the embodiment. FIG. 3 is a cross-sectional view illustrating the configuration of the magnetic head. FIG. 4 is a front view illustrating the medium facing surface of the magnetic head. FIG. 3 illustrates a cross section orthogonal to the medium facing surface and the top surface of the substrate. In FIG. 3 the arrow marked with T shows the direction of travel of a recording medium.

As shown in FIG. 3, the magnetic head of the embodiment has a medium facing surface 40 that faces toward the recording medium. As shown in FIG. 3 and FIG. 4, the magnetic head includes: a substrate 1 made of a ceramic material such as aluminum oxide and titanium carbide ($Al_2O_3$—TiC); an insulating layer 2 made of an insulating material such as alumina ($Al_2O_3$) and disposed on the substrate 1; a first read shield layer 3 made of a magnetic material and disposed on the insulating layer 2; an MR element 5 disposed on the first read shield layer 3; two bias magnetic field applying layers 6 respectively disposed adjacent to two sides of the MR element 5 with insulating films (not shown) respectively disposed therebetween; and an insulating layer 7 disposed around the MR element 5 and the bias magnetic field applying layers 6. The MR element 5 has an end located in the medium facing surface 40. The insulating layer 7 is made of an insulating material such as alumina. The magnetic head further includes: a second read shield layer 8 made of a magnetic material and disposed on the MR element 5, the bias magnetic field applying layers 6 and the insulating layer 7; and a separating layer 9 made of a nonmagnetic material such as alumina and disposed on the second read shield layer 8. The portion from the first read shield layer 3 to the second read shield layer 8 makes up a read head.

The MR element 5 is a TMR element. A sense current for detecting magnetic signals is fed to the MR element 5 in a direction intersecting the plane of each layer making up the MR element 5, such as the direction perpendicular to the plane of each layer making up the MR element 5.

The magnetic head further includes: a magnetic layer 10 made of a magnetic material and disposed on the separating layer 9; and an insulating layer 11 made of an insulating material such as alumina and disposed around the magnetic layer 10. The magnetic layer 10 has an end face located in the medium facing surface 40. The magnetic layer 10 and the insulating layer 11 have flattened top surfaces.

The magnetic head further includes: a coupling layer 12 made of a magnetic material and disposed on a region of the magnetic layer 10 away from the medium facing surface 40; and an insulating layer 13 made of an insulating material such as alumina and disposed around the coupling layer 12. The coupling layer 12 and the insulating layer 13 have flattened top surfaces.

The magnetic head further includes two coil elements 14a and 14b disposed on the insulating layer 13 in a neighborhood of the medium facing surface 40. As shown in FIG. 1 and FIG. 2, each of the coil elements 14a and 14b has a shape that is long in one direction and is disposed parallel to the medium facing surface 40. As shown in FIG. 3, the cross section of each of the coil elements 14a and 14b orthogonal to the longitudinal direction is rectangular. One of surfaces of the coil element 14a is located in the medium facing surface 40. The coil element 14b is disposed away from the medium facing surface 40 and parallel to the coil element 14a. A gap is formed between the coil elements 14a and 14b.

As shown in FIG. 1 and FIG. 2, the coil element 14a has a first end 14a1 and a second end 14a2 located opposite to each other. Similarly, the coil element 14b has a first end 14b1 and a second end 14b2 located opposite to each other. A lead 14d is connected to the first end 14a1 of the coil element 14a while a lead 14e is connected to the first end 14b1 of the coil element 14b. The coil element 14a and the lead 14d are different portions of a single layer made of a conductive material. Similarly, the coil element 14b and the lead 14e are different portions of another single layer made of a conductive material.

The magnetic head further includes an insulating layer 15 made of an insulating material such as alumina and disposed to cover the coil elements 14a and 14b. The insulating layer 15 has an opening for exposing the top surface of the coupling layer 12.

The magnetic head further includes a pole layer 16 made of a magnetic material and disposed on the insulating layer 15. The pole layer 16 has an end face located in the medium facing surface 40. The pole layer 16 is connected to the top surface of the coupling layer 12 through the opening of the insulating layer 15. As a result, the pole layer 16 is connected to the magnetic layer 10 through the coupling layer 12 at a position away from the medium facing surface 40.

As shown in FIG. 1 and FIG. 2, the pole layer 16 includes: a track width defining portion 16A having a first end located in the medium facing surface 40 and a second end opposite to the first end; and a wide portion 16B connected to the second end of the track width defining portion 16A. The first end of the track width defining portion 16A located in the medium facing surface 40 defines the track width. The track width defining portion 16A has a width taken in the track width direction, and the wide portion 16B has a width taken in the track width direction that is greater than the width of the track width defining portion taken in the track width direction. The track width direction is the vertical direction in FIG. 2.

The width of the track width defining portion 16A taken in the track width direction is nearly uniform. The wide portion 16B includes: a flare portion 16B1 having an end connected to the second end of the track width defining portion 16A and having a width taken in the track width direction that increases with increasing distance from the medium facing surface 40; and a uniform width portion 16B2 located on a side of the flare portion 16B1 opposite to the track width defining portion 16A. The width of the uniform width portion 16B2 taken in the track width direction is uniform. The width of the uniform width portion 16B2 taken in the track width direction is equal to the maximum width W of the wide portion 16B taken in the track width direction. In FIG. 2, the broken line marked with 16C indicates the boundary between the track width defining portion 16A and the wide portion 16B, while the broken line marked with 16D indicates the boundary between the flare portion 16B1 and the uniform width portion 16B2. For example, the width of the flare portion 16B1 taken in the track width direction is equal to the width of the track width defining portion 16A at the position of the boundary 16C between the track width defining portion 16A and the wide portion 16B, then gradually increases with increasing distance from the medium facing surface 40, and then becomes equal to the width of the uniform width portion 16B2 at the position of the boundary 16D between the flare portion 16B1 and the uniform width portion 16B2.

As shown in FIG. 2, the flare portion 16B1 has two side surfaces 16B11 and 16B12 located on opposite sides in the track width direction. The side surfaces 16B11 and 16B12 are located at outer positions relative to the track width defining portion 16A along the track width direction, and face toward the medium facing surface 40.

In the embodiment, such a configuration is possible that the wide portion 16B does not include the flare portion 16B1 but includes the uniform width portion 16B2 only. In this case, the uniform width portion 16B2 is connected to the second end of the track width defining portion 16A. Furthermore, in this case, the uniform width portion 16B2 has two front end faces that are located at outer positions relative to the track width defining portion 16A along the track width direction and that face toward the medium facing surface 40. The two front end faces are parallel to the medium facing surface 40.

As shown in FIG. 3 and FIG. 4, the magnetic head further includes an insulating layer 17 disposed to cover at least the track width defining portion 16A of the pole layer 16. The insulating layer 17 is made of an insulating material such as alumina.

Part of the insulating layer 17 is located on the insulating layer 15. The insulating layer 15 has a first opening for exposing a portion of the top surface of the coil element 14a near the second end 14a2, and a second opening for exposing a portion of the top surface of the coil element 14b near the second end 14b2.

The magnetic head further includes a coil element 14c made of a conductive material and disposed on the insulating layer 17. The coil element 14c has a first end 14c1 and a second end 14c2 located opposite to each other, and is disposed to extend over the track width defining portion 16A. A portion of the coil element 14c near the first end 14c1 is connected to the portion of the top surface of the coil element 14a near the second end 14a2 through the first opening of the insulating layer 15. In a neighborhood of the first end 14c1, a portion of the peripheral surface of the coil element 14c is located in the medium facing surface 40. A portion of the coil element 14c near the second end 14c2 is connected to the portion of the top surface of the coil element 14b near the second end 14b2 through the second opening of the insulating layer 15. As shown in FIG. 3, the cross section of the coil element 14c orthogonal to the longitudinal direction is rectangular.

The coil elements 14a, 14b and 14c constitute a coil 14. The coil 14 is helically wound only around the track width defining portion 16A of the pole layer 16. As shown in FIG. 2, the coil 14 has a portion located between the medium facing surface 40 and the wide portion 16B. To be more specific, the coil 14 has a portion located between the medium facing surface 40 and the two side surfaces 16B11, 16B12 of the flare portion 16B1 of the wide portion 16B.

As shown in FIG. 3 and FIG. 4, the magnetic head further includes an overcoat layer 18 disposed to cover the insulating layer 15, the pole layer 16, the insulating layer 17 and the coil element 14c. The overcoat layer 18 is made of an insulating material such as alumina. The portion from the magnetic layer 10 to the coil element 14c makes up a write head.

As described so far, the magnetic head includes the medium facing surface 40 that faces toward the recording medium, the read head, and the write head. The read head and the write head are stacked on the substrate 1. The read head is disposed backward along the direction T of travel of the recording medium (that is, disposed closer to the air-inflow end of the slider), while the write head is disposed forward along the direction T of travel of the recording medium (that is, disposed closer to the air-outflow end of the slider). The magnetic head writes data on the recording medium through the use of the write head, and reads data stored on the recording medium through the use of the read head.

The read head includes the MR element 5, and the first read shield layer 3 and the second read shield layer 8 that are disposed to sandwich the MR element 5 therebetween. FIG. 3 and FIG. 4 illustrate an example in which the MR element 5 is a TMR element. The first read shield layer 3 and the second read shield layer 8 also function as a pair of electrodes for feeding a sense current to the MR element 5 in a direction intersecting the plane of each layer making up the MR element 5, such as the direction perpendicular to the plane of each layer making up the MR element 5. Besides the first read shield layer 3 and the second read shield layer 8, there may be provided a pair of electrodes on top and bottom of the MR element 5, respectively. The MR element 5 has a resistance that changes in response to an external magnetic field, that is, a signal magnetic field sent from the recording medium. The resistance of the MR element 5 can be determined from the sense current. It is thus possible for the read head to read data stored on the recording medium.

The MR element 5 is not limited to the TMR element but may be a GMR (giant-magnetoresistive) element. The GMR element may be one having a CIP (current-in-plane) structure in which the sense current is fed in a direction nearly parallel to the plane of each layer making up the GMR element, or may be one having a CPP (current-perpendicular-to-plane) structure in which the sense current is fed in a direction intersecting the plane of each layer making up the GMR element, such as the direction perpendicular to the plane of each layer making up the GMR element. In the case where the MR element 5 is a GMR element having the CIP structure, a pair of electrodes for feeding the sense current to the MR element 5 are respectively provided on both sides of the MR element 5 that are opposed to each other in the width direction, and shield gap films made of an insulating material are respectively provided between the MR element 5 and the first read shield layer 3 and between the MR element 5 and the second read shield layer 8.

The write head includes the magnetic layer 10, the coupling layer 12, the coil 14 and the pole layer 16. The coil 14 generates a magnetic field corresponding to data to be written on the recording medium. The pole layer 16 has the end face located in the medium facing surface 40, allows a magnetic flux corresponding to the magnetic field generated by the coil 14 to pass therethrough, and generates a write magnetic field for writing the data on the recording medium by means of the perpendicular magnetic recording system. The pole layer 16 is connected to the magnetic layer 10 through the coupling layer 12 at a position away from the medium facing surface 40. The magnetic layer 10, the coupling layer 12 and the pole layer 16 form a magnetic path that allows the magnetic flux corresponding to the magnetic field generated by the coil 14 to pass. The magnetic layer 10 has a function of returning a magnetic flux that has been generated from the end face of the pole layer 16 and has magnetized the recording medium.

The pole layer 16 includes the track width defining portion 16A having the first end located in the medium facing surface 40 and the second end opposite to the first end, and the wide portion 16B connected to the second end of the track width defining portion. The first end of the track width defining portion 16A located in the medium facing surface 40 defines the track width. The track width defining portion 16A has a width taken in the track width direction, and the wide portion 16B has a width taken in the track width direction that is greater than the width of the track width defining portion 16A taken in the track width direction.

The coil 14 is helically wound only around the track width defining portion 16A of the pole layer 16. The coil 14 has a portion located between the medium facing surface 40 and the wide portion 16B. As shown in FIG. 2, the maximum outer diameter D of the coil 14 taken in the track width direction is equal to or smaller than the maximum width W of the wide portion 16B taken in the track width direction.

The coil 14 has portions located in the medium facing surface 40. To be specific, the portions of the coil 14 located in the medium facing surface 40 are one of the surfaces of the coil element 14a and a portion of the peripheral surface of the coil element 14c near the first end 14c1 of the coil element 14c. In the embodiment, as thus described, because the coil 14 has the portions located in the medium facing surface 40, it is preferred that the coil 14 be made of a corrosion-resistant material such as Au.

In the embodiment, the length of the track width defining portion 16A taken in the direction orthogonal to the medium facing surface 40 is within a range of 60 to 1000 nm, for example. The line width of each of the coil elements 14a, 14b and 14c, that is, the dimension of each of these elements taken in the direction orthogonal to the medium facing surface 40, is within a range of 20 to 400 nm, for example. The thickness of each of the coil elements 14a, 14b and 14c, that is, the dimension of each of these elements taken in the direction orthogonal to the top surface of the substrate 1, is within a range of 20 to 1000 nm, for example. The gap between the coil elements 14a and 14b is within a range of 20 to 200 nm, for example.

A method of manufacturing the magnetic head of the embodiment will now be described with reference to FIG. 5A to FIG. 8C. Portions located below the insulating layer 13 are omitted from FIG. 5A to FIG. 8C. In FIG. 5A to FIG. 8C the broken line marked with ABS indicates the position at which the medium facing surface 40 is to be formed.

In the method of manufacturing the magnetic head of the embodiment, for example, components of a plurality of magnetic heads are formed on a single substrate (wafer) to thereby fabricate a substructure in which pre-slider portions each of which is to become a slider later are aligned in a plurality of rows. Next, the substructure is cut to fabricate a slider aggregate including a single row of the pre-slider portions. Next, a surface formed in the slider aggregate by cutting the substructure is lapped to form the medium facing surfaces 40 of the pre-slider portions that the slider aggregate includes. Next, flying rails are formed in the medium facing surfaces 40. Next, the slider aggregate is cut so that the pre-slider portions are separated from one another, and a plurality of sliders respectively including the magnetic heads are thereby obtained.

Attention being drawn to one of the magnetic heads, the method of manufacturing the magnetic head of the embodiment will now be described. In this method, first, the insulating layer 2 is formed on the substrate 1. Next, the first read shield layer 3 is formed on the insulating layer 2. Next, the MR element 5, the two bias magnetic field applying layers 6 and the insulating layer 7 are formed on the first read shield layer 3. Next, the second read shield layer 8 is formed on the MR element 5, the bias magnetic field applying layers 6 and the insulating layer 7. Next, the separating layer 9 is formed on the second read shield layer 8.

Next, the magnetic layer 10 is formed on the separating layer 9 by frame plating, for example. Next, the insulating layer 11 is formed to cover the magnetic layer 10. Next, the insulating layer 11 is polished by chemical mechanical polishing (hereinafter referred to as CMP), for example, so that the magnetic layer 10 is exposed, and the top surfaces of the magnetic layer 10 and the insulating layer 11 are thereby flattened. Next, the coupling layer 12 is formed on the magnetic layer 10 by frame plating, for example. Next, the insulating layer 13 is formed to cover the coupling layer 12. Next, the insulating layer 13 is polished by CMP, for example, so that the coupling layer 12 is exposed, and the top surfaces of the coupling layer 12 and the insulating layer 13 are thereby flattened.

Figure 5A:
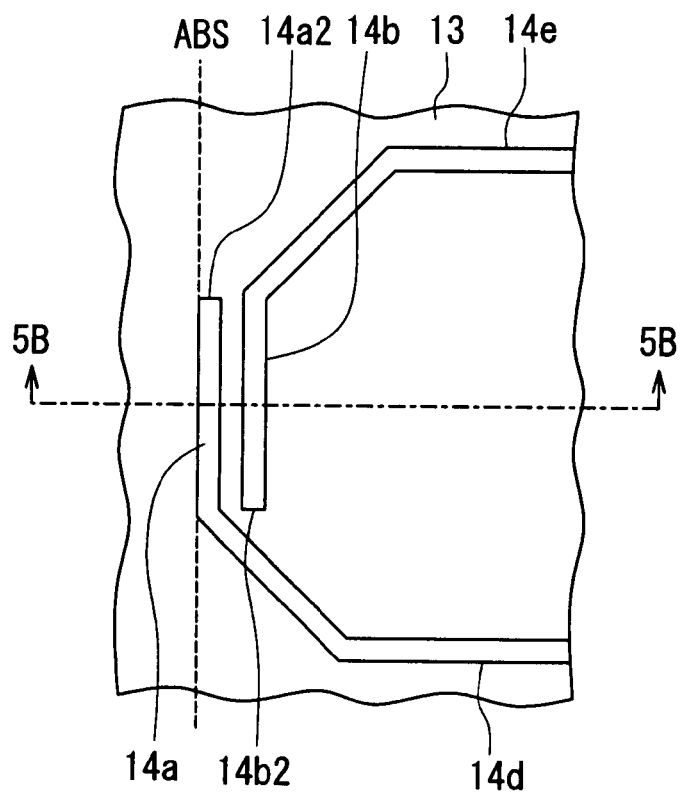
FIG. 5A to FIG. 5C are explanatory views illustrating a step of a method of manufacturing the magnetic head of the first embodiment of the invention.
Figure 5B:
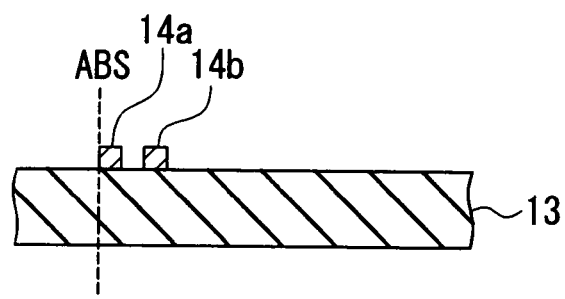
Figure 5C:
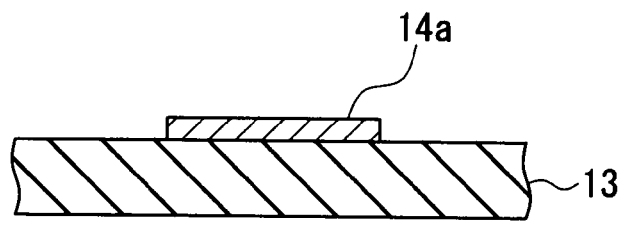

FIG. 5A to FIG. 5C illustrate the next step. FIG. 5A is a top view of a stack of layers obtained in the course of the manufacture of the magnetic head. FIG. 5B is a cross-sectional view of the stack of layers of FIG. 5A taken along line 5B-5B. FIG. 5C is a cross-sectional view illustrating a cross section of the stack of layers of FIG. 5A taken in the plane ABS. In this step, the coil elements 14a and 14b and the leads 14d and 14e are formed on the insulating layer 13 by frame plating, for example.

Figure 6A:
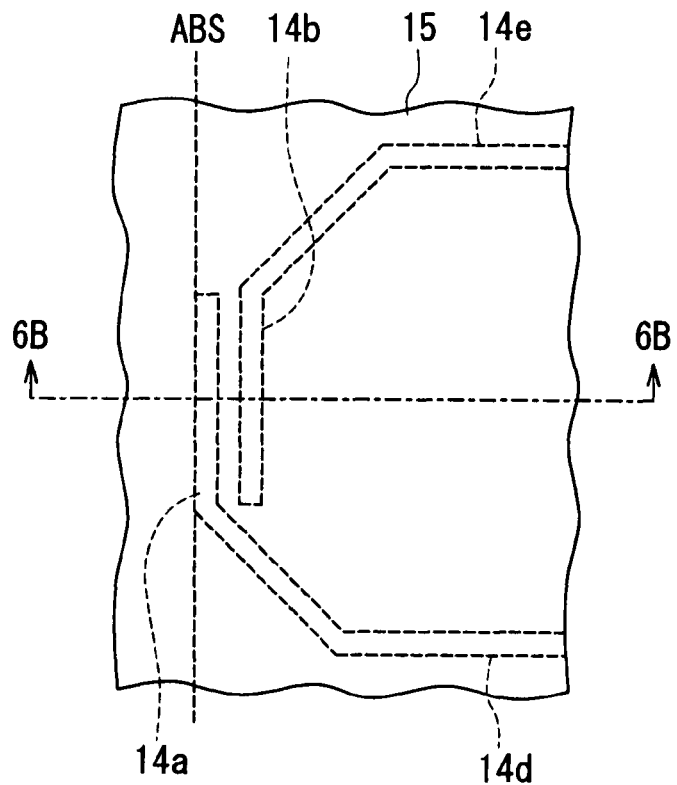
FIG. 6A to FIG. 6C are explanatory views illustrating a step that follows the step illustrated in FIG. 5A to FIG. 5C.
Figure 6B:
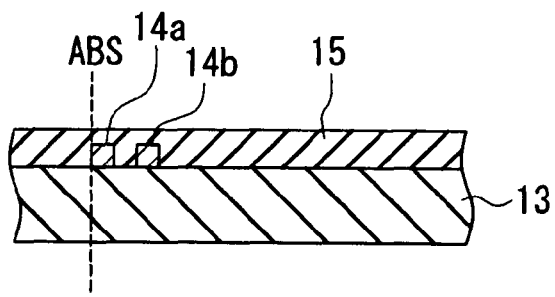
Figure 6C:
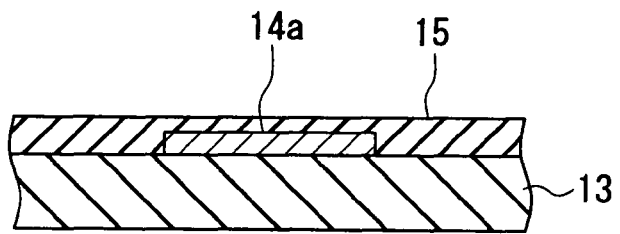

FIG. 6A to FIG. 6C illustrate the next step. FIG. 6A is a top view of a stack of layers obtained in the course of the manufacture of the magnetic head. FIG. 6B is a cross-sectional view of the stack of layers of FIG. 6A taken along line 6B-6B. FIG. 6C is a cross-sectional view illustrating a cross section of the stack of layers of FIG. 6A taken in the plane ABS. In this step, first, the insulating layer 15 is formed to cover the coil elements 14a and 14b and the leads 14d and 14e. Next, as shown in FIG. 3, the insulating layer 15 is partially etched to thereby form in the insulating layer 15 the opening for exposing the top surface of the coupling layer 12.

Figure 7A:
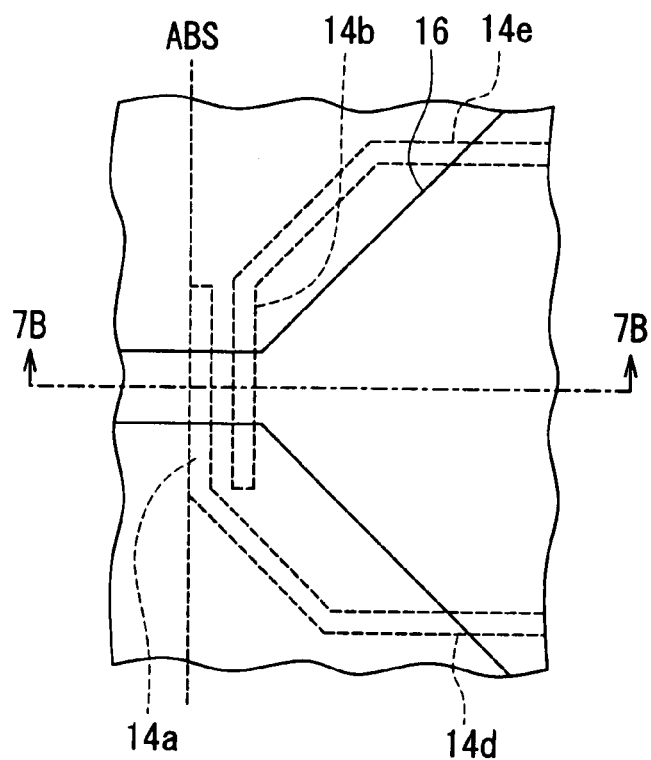
FIG. 7A to FIG. 7C are explanatory views illustrating a step that follows the step illustrated in FIG. 6A to FIG. 6C.
Figure 7B:
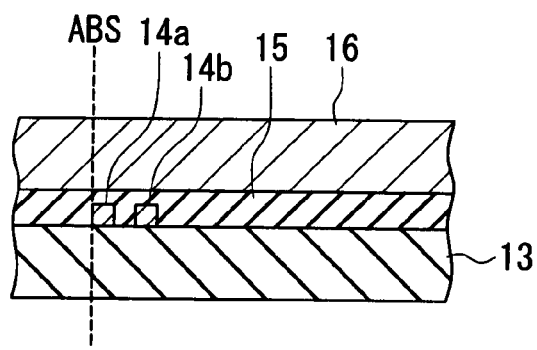
Figure 7C:
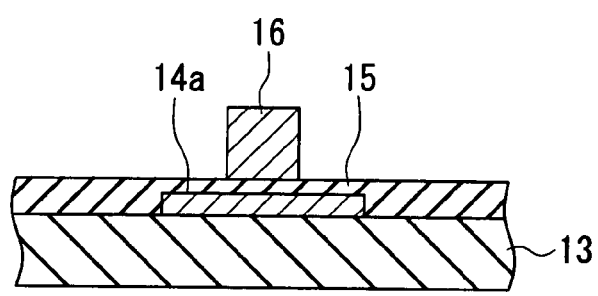

FIG. 7A to FIG. 7C illustrate the next step. FIG. 7A is a top view of a stack of layers obtained in the course of the manufacture of the magnetic head. FIG. 7B is a cross-sectional view of the stack of layers of FIG. 7A taken along line 7B-7B. FIG. 7C is a cross-sectional view illustrating a cross section of the stack of layers of FIG. 7A taken in the plane ABS. In this step, the pole layer 16 is formed on the insulating layer 15. The pole layer 16 is connected to the top surface of the coupling layer 12 through the opening of the insulating layer 15.

Figure 8A:
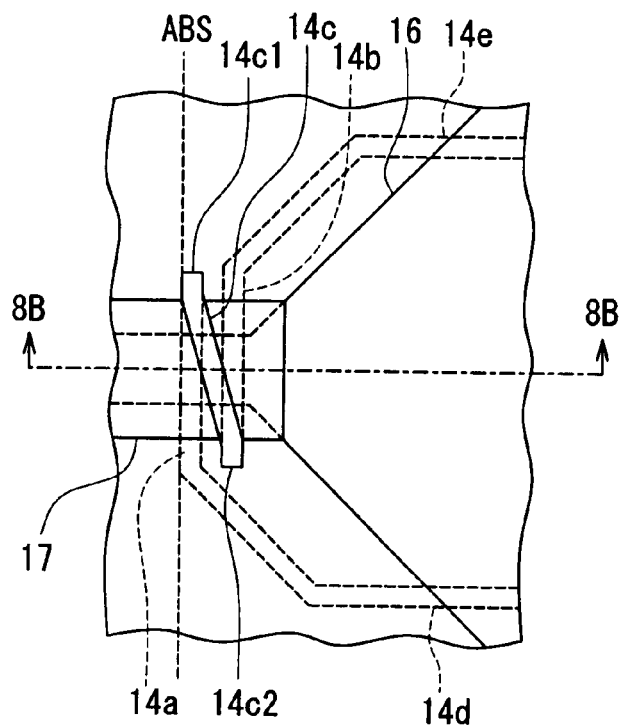
FIG. 8A to FIG. 8C are explanatory views illustrating a step that follows the step illustrated in FIG. 7A to FIG. 7C.
Figure 8B:
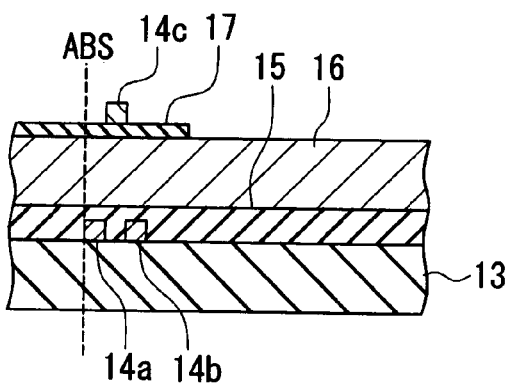
Figure 8C:
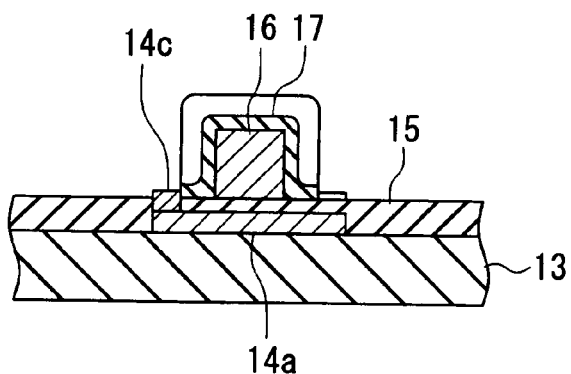

FIG. 8A to FIG. 8C illustrate the next step. FIG. 8A is a top view of a stack of layers obtained in the course of the manufacture of the magnetic head. FIG. 8B is a cross-sectional view of the stack of layers of FIG. 8A taken along line 8B-8B. FIG. 8C is a cross-sectional view illustrating a cross section of the stack of layers of FIG. 8A taken in the plane ABS.

In this step, first, the insulating layer 17 is formed to cover at least the track width defining portion 16A of the pole layer 16. Next, the insulating layer 15 is partially etched to thereby form in the insulating layer 15 the first opening for exposing the portion of the top surface of the coil element 14a near the second end 14a2 and the second opening for exposing the portion of the top surface of the coil element 14b near the second end 14b2. Next, the coil element 14c is formed on the insulating layer 17 by frame plating, for example. The portion of the coil element 14c near the first end 14c1 is connected to the portion of the top surface of the coil element 14a near the second end 14a2 through the first opening of the insulating layer 15. The portion of the coil element 14c near the second end 14c2 is connected to the portion of the top surface of the coil element 14b near the second end 14b2 through the second opening of the insulating layer 15.

Next, as shown in FIG. 3, the overcoat layer 18 is formed. Wiring, terminals and so on are then formed on the overcoat layer 18. In the embodiment, two terminals connected to the MR element 5 and two terminals connected to the coil 14 through the leads 14d and 14e are formed on the overcoat layer 18. The substructure is thus fabricated.

Next, as previously described, the substructure is cut, the surface to be the medium facing surface 40 is lapped to form the medium facing surface 40, flying rails are formed in the medium facing surface 40, and the slider including the magnetic head is thus completed.

In the embodiment, the coil 14 is helically wound only around the track width defining portion 16A of the pole layer 16, and has a portion located between the medium facing surface 40 and the wide portion 16B. In the embodiment, a greater part of the magnetic flux corresponding to the magnetic field generated by the coil 14 passes through the track width defining portion 16A located in the space surrounded by the coil 14. As a result, according to the embodiment, it is possible to improve write characteristics while suppressing the occurrence of problems resulting from flux leakage occurring in a portion of the medium facing surface 40 other than the end face of the pole layer 16. To be specific, according to the embodiment, it is possible to improve the overwrite property while suppressing adjacent track erase.

Figure 9:
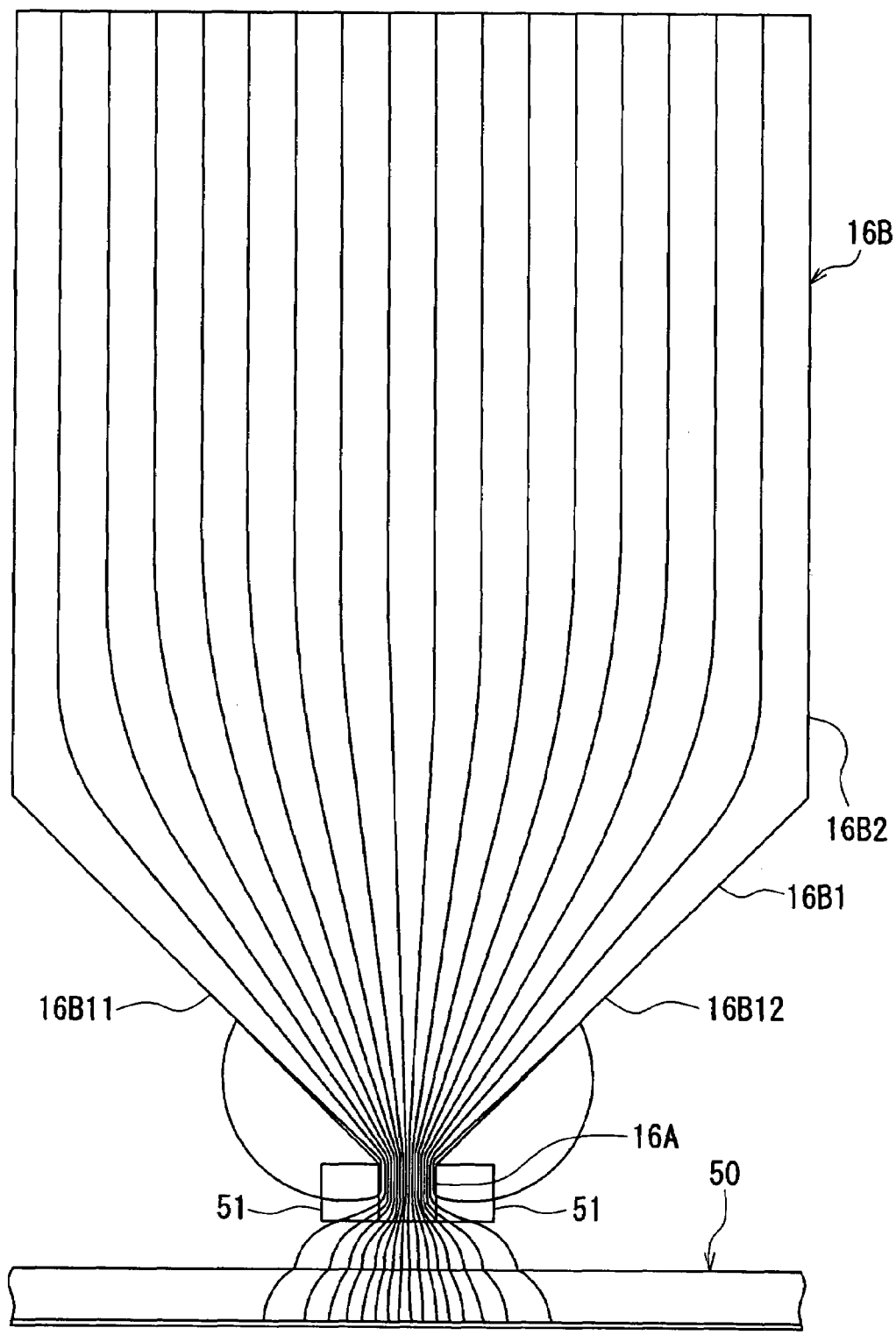
FIG. 9 is an explanatory view illustrating the distribution of magnetic flux inside and around the pole layer of the first embodiment of the invention by simulation.
Figure 10:
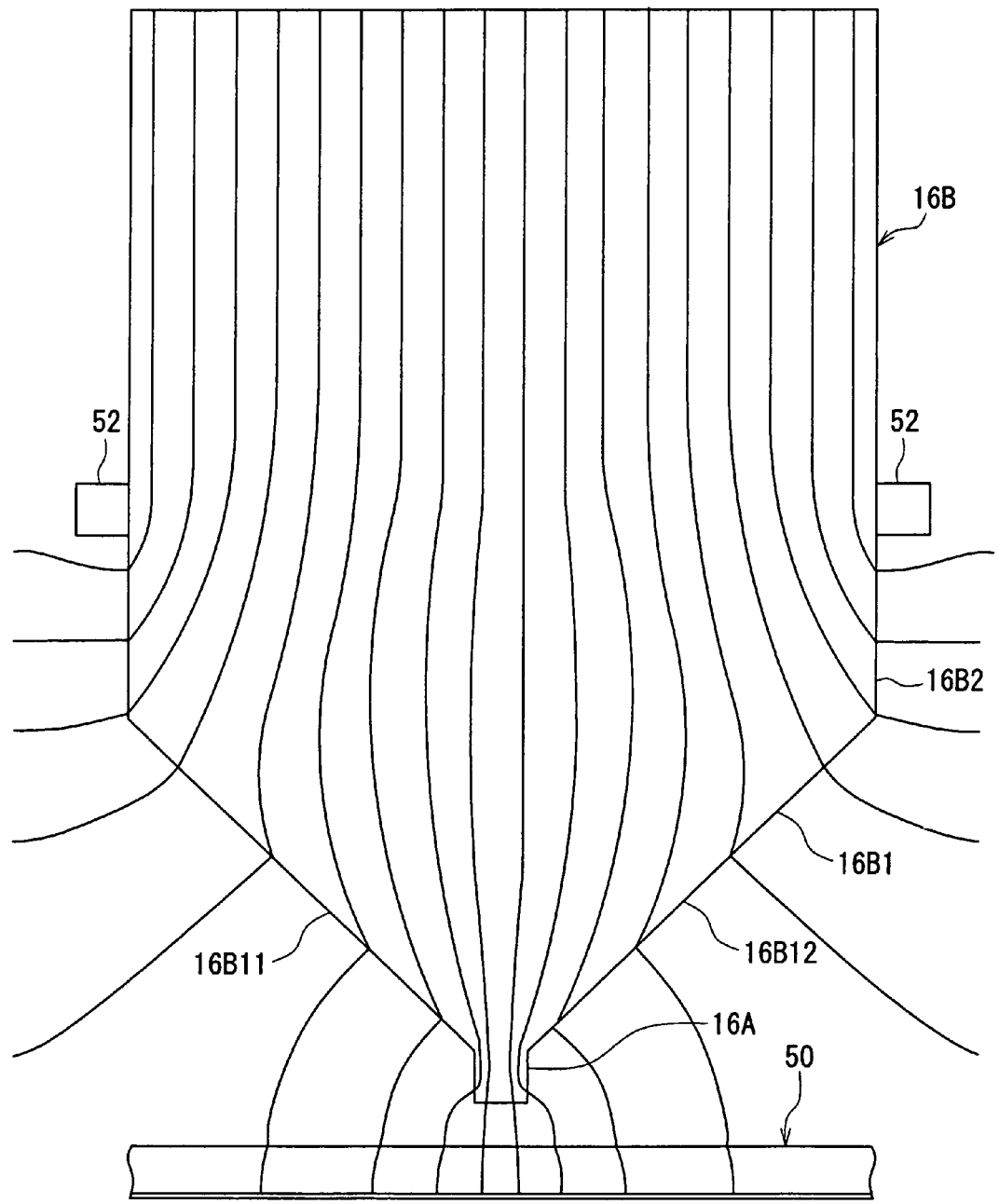
FIG. 10 is an explanatory view illustrating the distribution of magnetic flux inside and around a pole layer of a comparative example by simulation.

A description will now be made on simulation results that indicate the foregoing effects of the embodiment. FIG. 9 is an explanatory view illustrating the distribution of magnetic flux inside and around the pole layer 16 of a model of the embodiment by simulation. FIG. 10 is an explanatory view illustrating the distribution of magnetic flux inside and around the pole layer 16 of a model of a comparative example by simulation. In FIG. 9, numeral 51 indicates a region in which the coil 14 is located in the model of the embodiment. In FIG. 10, numeral 52 indicates a region in which a coil that is an alternative to the coil 14 of the embodiment is located in the model of the comparative example. As shown, the model of the comparative example has a coil helically wound around the uniform width portion 16B2 of the wide portion 16B, instead of the coil 14 of the embodiment that is helically wound only around the track width defining portion 16A. In FIG. 9 and FIG. 10, numeral 50 indicates a recording medium composed of layers of a soft magnetic material. In FIG. 9 and FIG. 10, a plurality of curved lines drawn inside and around the pole layer 16 indicate magnetic flux.

Figure 11:
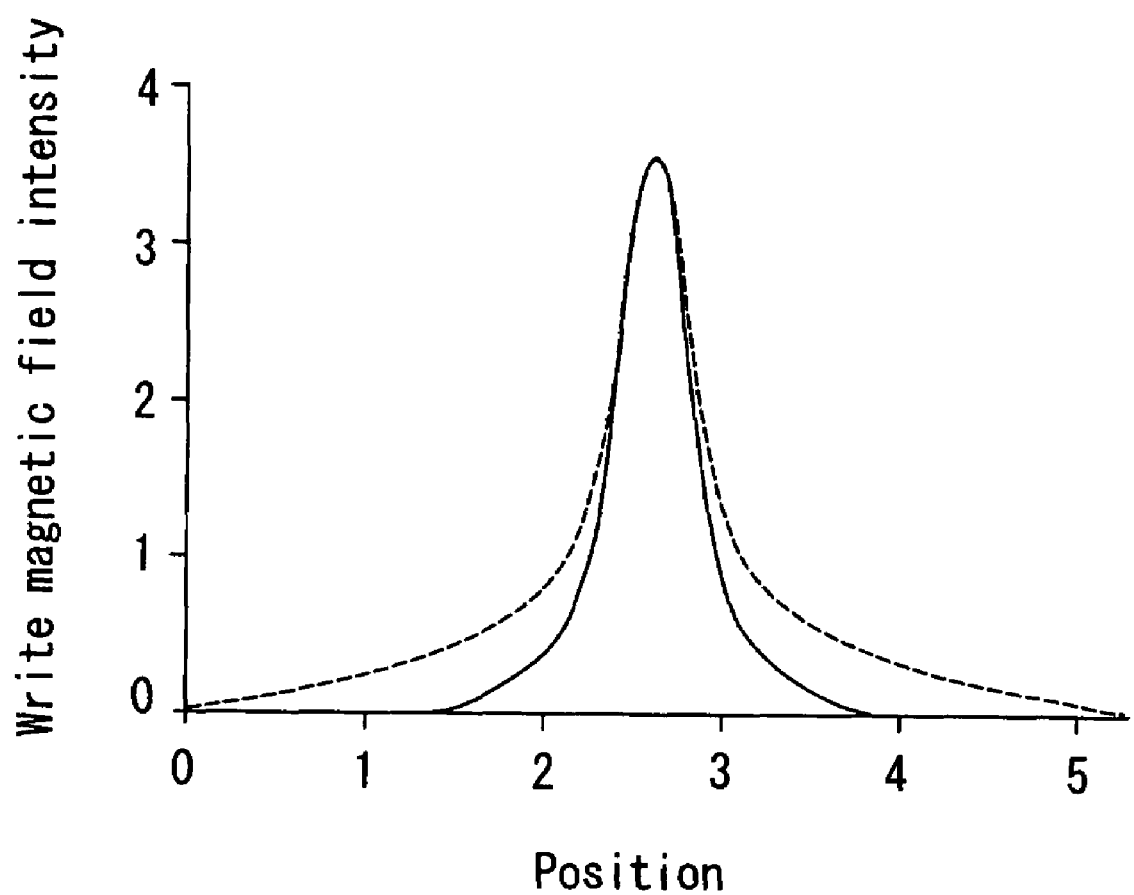
FIG. 11 is a plot illustrating the relationship between the position along the track width direction and the write magnetic field intensity obtained by the simulations shown in FIG. 9 and FIG. 10.

FIG. 11 is a plot illustrating the relationship between the position along the track width direction and the write magnetic field intensity obtained by the simulations shown in FIG. 9 and FIG. 10. In FIG. 11, the horizontal axis indicates the position on the surface of the recording medium 50 along the track width direction while the vertical axis indicates the write magnetic field intensity on the surface of the recording medium 50. The unit of values on each of the horizontal and vertical axes is an arbitrary one. In FIG. 11 the solid curved line indicates the write magnetic field intensity of the model of the embodiment shown in FIG. 9, while the broken curved line indicates the write magnetic field intensity of the model of the comparative example shown in FIG. 10.

As can be seen from FIG. 10, in the comparative example, a greater part of the magnetic flux passing through the wide portion 16B leaks to the outside of the pole layer 16 from the side surfaces 16B11 and 16B12 of the flare portion 16B1, and part of such leaking flux reaches the recording medium 50. In contrast, according to the embodiment, as can be seen from FIG. 9, a greater part of the magnetic flux passing through the wide portion 16B passes through the track width defining portion 16A, and only a very small part of the flux leaks to the outside of the pole layer 16 from the side surfaces 16B11 and 16B12 of the flare portion 16B1. Consequently, as can be seen from FIG. 11, the range of distribution of the write magnetic field intensity of the embodiment is smaller than that of the comparative example. To be specific, according to the embodiment, the full width at half maximum of the curved line indicating the distribution of the write magnetic field intensity is smaller, and therefore the effective track width is smaller, compared with the comparative example. As a result, according to the embodiment, it is possible to improve the overwrite property while suppressing adjacent track erase.

In the embodiment, since the minute coil 14 is placed in the small space, there may be a fear that excessive heat could be generated by the coil 14. In the embodiment, however, since the coil 14 is located very close to the medium facing surface 40, the coil 14 is cooled by an airflow generated between the medium facing surface and the recording medium when the magnetic head is operated. Thus, according to the embodiment, it is possible to prevent heat generated by the coil 14 from becoming a problem.

If the coil 14 were devoid of a portion located between the medium facing surface 40 and the wide portion 16B (portion located between the medium facing surface 40 and the side surfaces 16B11 and 16B12 of the flare portion 16B1), that is, if the minimum inner diameter of the coil 14 taken in the track width direction were equal to or greater than the maximum width W of the wide portion 16B taken in the track width direction, a greater part of the magnetic flux would leak from the side surfaces 16B11 and 16B12 of the flare portion 16B1 to the outside of the pole layer 16 and reach the medium facing surface 40. For this reason, it is required that the coil 14 have a portion located between the medium facing surface 40 and the wide portion 16B.

The greater the maximum outer diameter D of the coil 14 taken in the track width direction, the more likely it is that there occurs a magnetic flux leaking from the side surfaces 16B11 and 16B12 of the flare portion 16B1 to the outside of the pole layer 16 and reaching the medium facing surface 40. It is therefore preferred that the maximum outer diameter D of the coil 14 taken in the track width direction be equal to or smaller than the maximum width W of the wide portion 16B, and the smaller the better.

Furthermore, if the coil 14 were wound around the entire pole layer 16 including the uniform width portion 16B2 of the wide portion 16B instead of being wound only around the track width defining portion 16A of the pole layer 16, the entire length of the coil 14 would be much greater and the resistance of the coil 14 would be much higher accordingly, compared with the case where the coil 14 is wound only around the track width defining portion 16A. In addition, if the coil 14 were wound around the entire pole layer 16, the coil 14 would be hard to cool. Because of the foregoing, heat generated by the coil 14 would become a problem if the coil 14 were wound around the entire pole layer 16. According to the embodiment, since the coil 14 is wound only around the track width defining portion 16A, it is possible to prevent heat generated by the coil 14 from becoming a problem.

Figure 12:
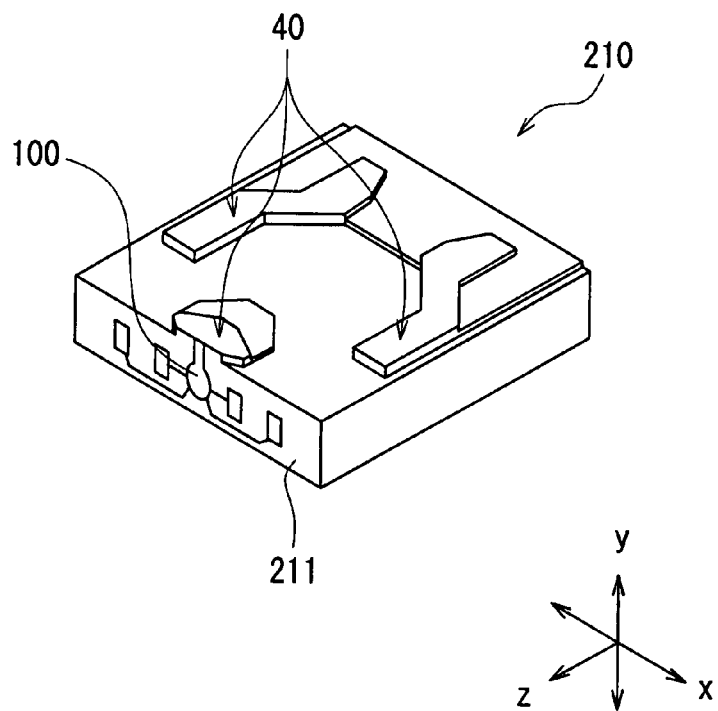
FIG. 12 is a perspective view illustrating an example of appearance of a slider including the magnetic head of the first embodiment of the invention.

A head assembly and a magnetic disk drive of the embodiment will now be described. Reference is now made to FIG. 12 to describe a slider 210 incorporated in the head assembly. In the magnetic disk drive, the slider 210 is placed to face toward a magnetic disk platter that is a circular-plate-shaped recording medium to be driven to rotate. The slider 210 has a base body 211 made up mainly of the substrate 1 and the overcoat layer 18 of FIG. 3. The base body 211 is nearly hexahedron-shaped. One of the six surfaces of the base body 211 faces toward the magnetic disk platter. The medium facing surface 40 is formed in this one of the surfaces. When the magnetic disk platter rotates in the z direction of FIG. 12, an airflow passes between the magnetic disk platter and the slider 210, and a lift is thereby generated below the slider 210 in the y direction of FIG. 12 and exerted on the slider 210. The slider 210 flies over the surface of the magnetic disk platter by means of the lift. The x direction of FIG. 12 is across the tracks of the magnetic disk platter. The thin-film magnetic head 100 of the embodiment is formed near the air-outflow-side end (the end located at the lower left of FIG. 12) of the slider 210.

Figure 13:
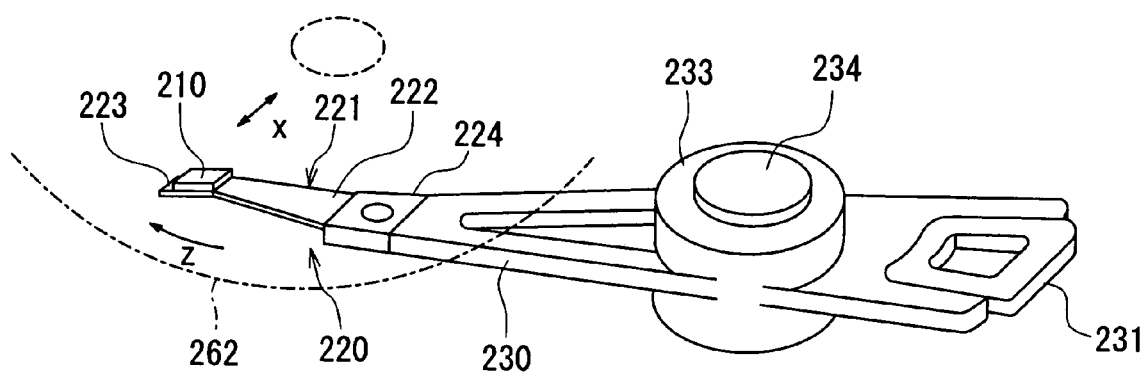
FIG. 13 is a perspective view of a head arm assembly of the first embodiment of the invention.

Reference is now made to FIG. 13 to describe the head assembly of the embodiment. The head assembly of the embodiment has the slider 210 and a supporter that flexibly supports the slider 210. Forms of this head assembly include a head gimbal assembly and a head arm assembly described below.

The head gimbal assembly 220 will be first described. The head gimbal assembly 220 has the slider 210 and a suspension 221 as the supporter that flexibly supports the slider 210. The suspension 221 has: a plate-spring-shaped load beam 222 made of stainless steel, for example; a flexure 223 to which the slider 210 is joined, the flexure 223 being located at an end of the load beam 222 and giving an appropriate degree of freedom to the slider 210; and a base plate 224 located at the other end of the load beam 222. The base plate 224 is attached to an arm 230 of an actuator for moving the slider 210 along the x direction across the tracks of the magnetic disk platter 262. The actuator has the arm 230 and a voice coil motor that drives the arm 230. A gimbal section for maintaining the orientation of the slider 210 is provided in the portion of the flexure 223 on which the slider 210 is mounted.

The head gimbal assembly 220 is attached to the arm 230 of the actuator. An assembly including the arm 230 and the head gimbal assembly 220 attached to the arm 230 is called a head arm assembly. An assembly including a carriage having a plurality of arms wherein the head gimbal assembly 220 is attached to each of the arms is called a head stack assembly.

FIG. 13 illustrates the head arm assembly of the embodiment. In the head arm assembly, the head gimbal assembly 220 is attached to an end of the arm 230. A coil 231 that is part of the voice coil motor is fixed to the other end of the arm 230. A bearing 233 is provided in the middle of the arm 230. The bearing 233 is attached to a shaft 234 that rotatably supports the arm 230.

Figure 14:
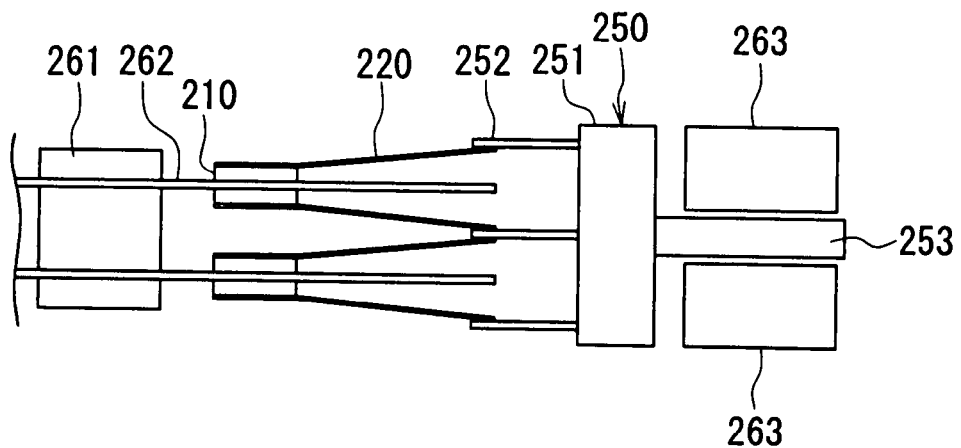
FIG. 14 is an explanatory view for illustrating a main part of a magnetic disk drive of the first embodiment of the invention.
Figure 15:
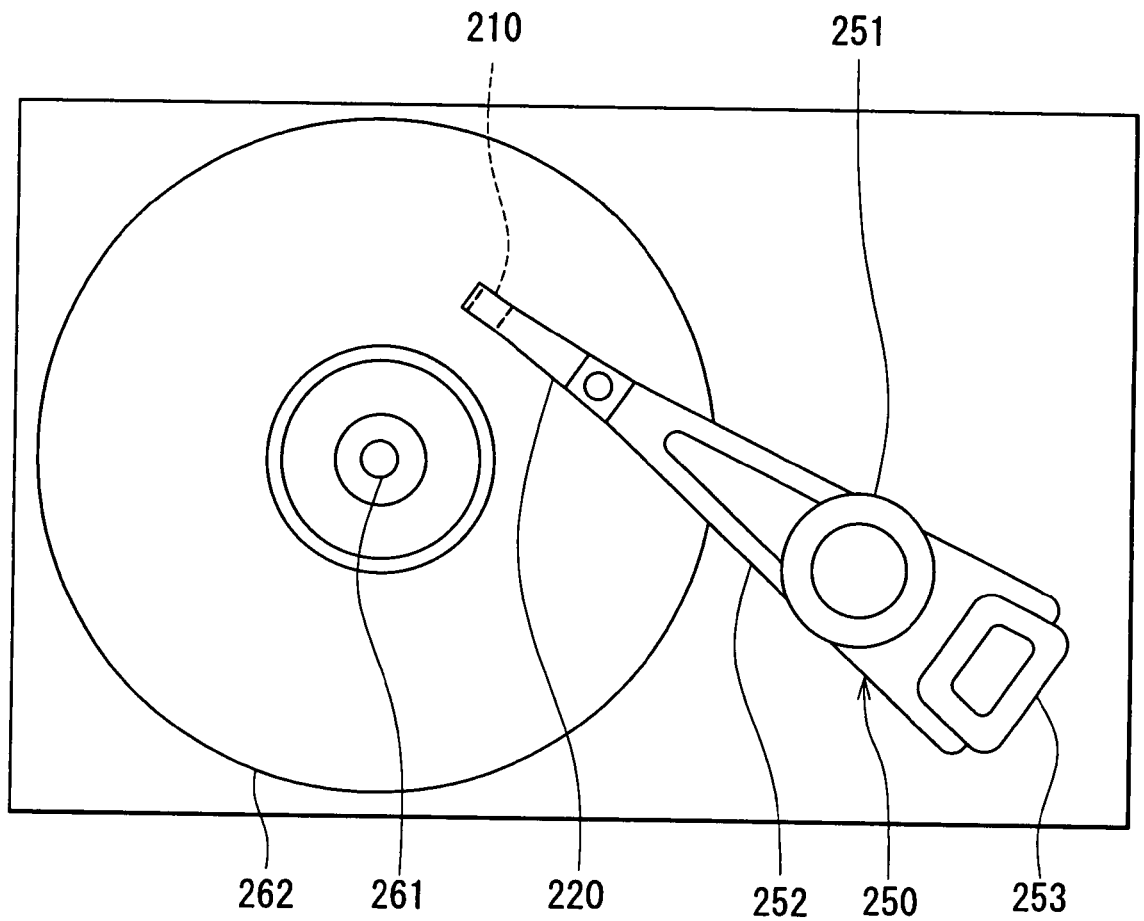
FIG. 15 is a top view of the magnetic disk drive of the first embodiment of the invention.

Reference is now made to FIG. 14 and FIG. 15 to describe an example of the head stack assembly and the magnetic disk drive of the embodiment. FIG. 14 is an explanatory view illustrating a main part of the magnetic disk drive, and FIG. 15 is a top view of the magnetic disk drive. The head stack assembly 250 incorporates a carriage 251 having a plurality of arms 252. A plurality of head gimbal assemblies 220 are attached to the arms 252 such that the assemblies 220 are arranged in the vertical direction with spacing between respective adjacent ones. A coil 253 that is part of the voice coil motor is mounted on the carriage 251 on a side opposite to the arms 252. The head stack assembly 250 is installed in the magnetic disk drive. The magnetic disk drive includes a plurality of magnetic disk platters 262 mounted on a spindle motor 261. Two of the sliders 210 are allocated to each of the platters 262, such that the two sliders 210 are opposed to each other with each of the platters 262 disposed in between. The voice coil motor includes permanent magnets 263 disposed to be opposed to each other, the coil 253 of the head stack assembly 250 being placed between the magnets 263.

The actuator and the head stack assembly 250 except the sliders 210 correspond to the alignment device of the invention, and support the sliders 210 and align them with respect to the magnetic disk platters 262.

In the magnetic disk drive of the embodiment, the actuator moves the slider 210 across the tracks of the magnetic disk platter 262 and aligns the slider 210 with respect to the magnetic disk platter 262. The magnetic head incorporated in the slider 210 writes data on the magnetic disk platter 262 by using the write head, and reads data stored on the magnetic disk platter 262 by using the read head.

The head assembly and the magnetic disk drive of the embodiment exhibit effects similar to those of the magnetic head of the embodiment described previously.

Second Embodiment

Figure 16:
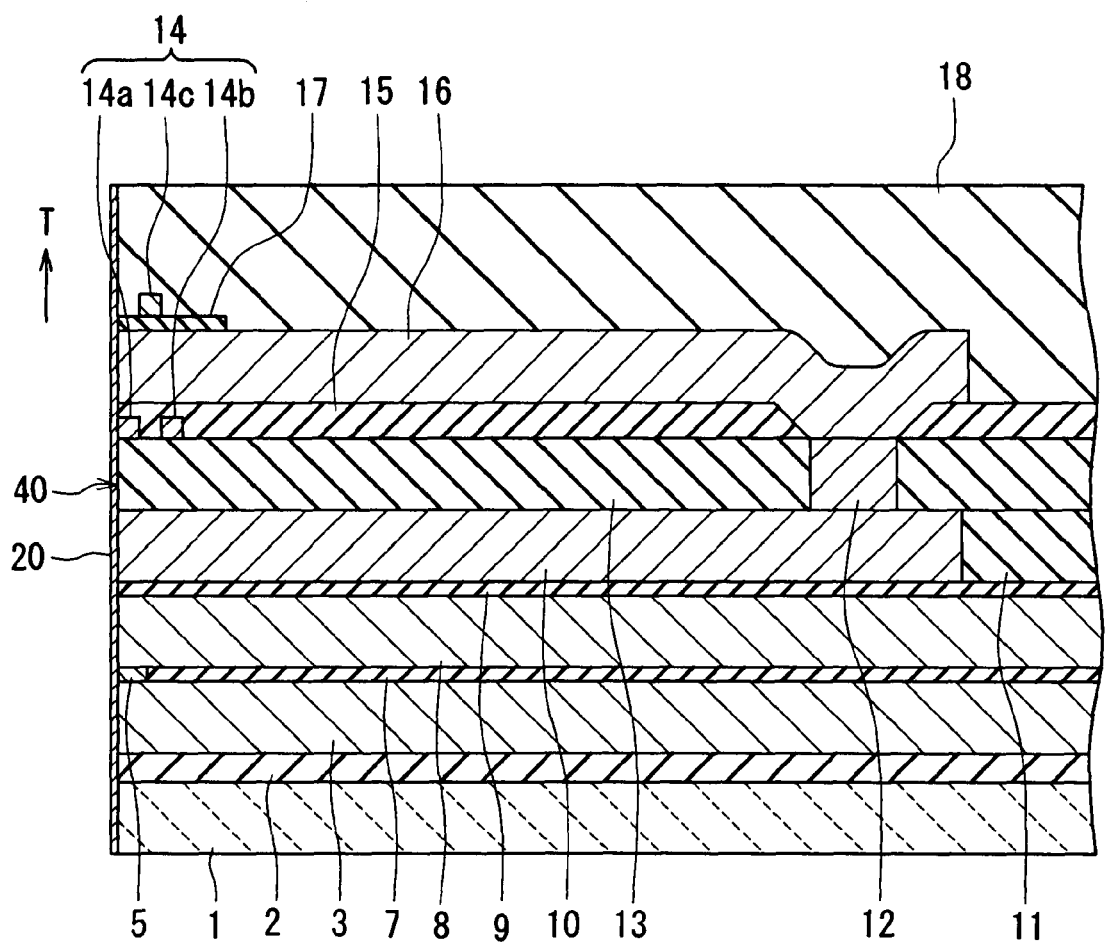
FIG. 16 is a cross-sectional view illustrating the configuration of a magnetic head of a second embodiment of the invention.

A second embodiment of the invention will now be described with reference to FIG. 16. FIG. 16 is a cross-sectional view illustrating the configuration of a magnetic head of the second embodiment. FIG. 16 illustrates a cross section orthogonal to the medium facing surface and the top surface of the substrate. In FIG. 16 the arrow marked with T shows the direction of travel of the recording medium.

The magnetic head of the second embodiment includes a protection film 20 for covering the medium facing surface 40. The protection film 20 can be made of diamond-like carbon or SiC, for example.

According to the second embodiment, since the protection film 20 is provided, it is possible to prevent the coil 14 from being corroded even when the coil 14 is made of a material liable to corrosion such as Cu and has a portion located in the medium facing surface 40.

The remainder of configuration, operation and effects of the second embodiment are similar to those of the first embodiment.

Third Embodiment

Figure 17:
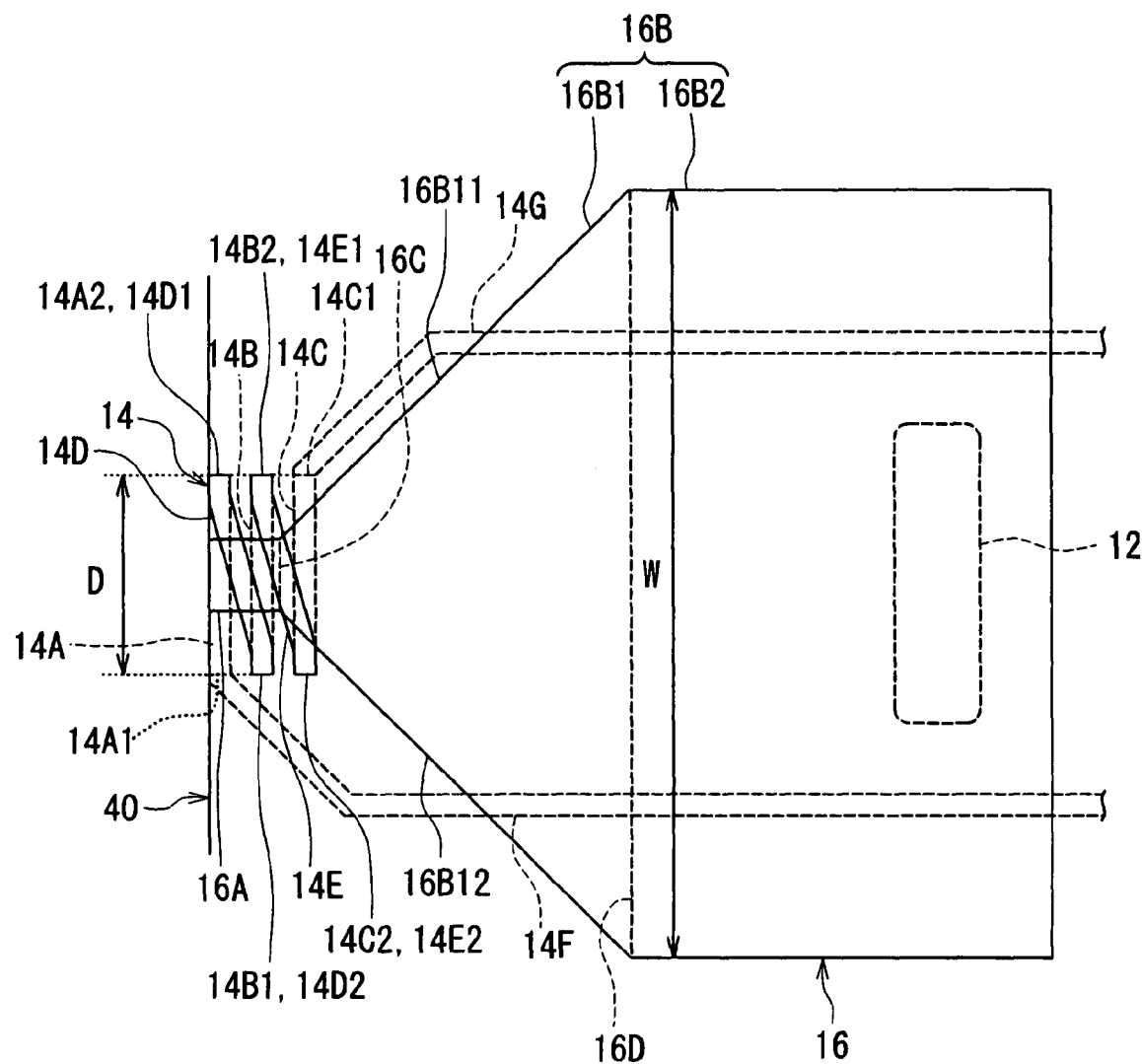
FIG. 17 is a top view illustrating a pole layer and a coil of a third embodiment of the invention.
Figure 18:
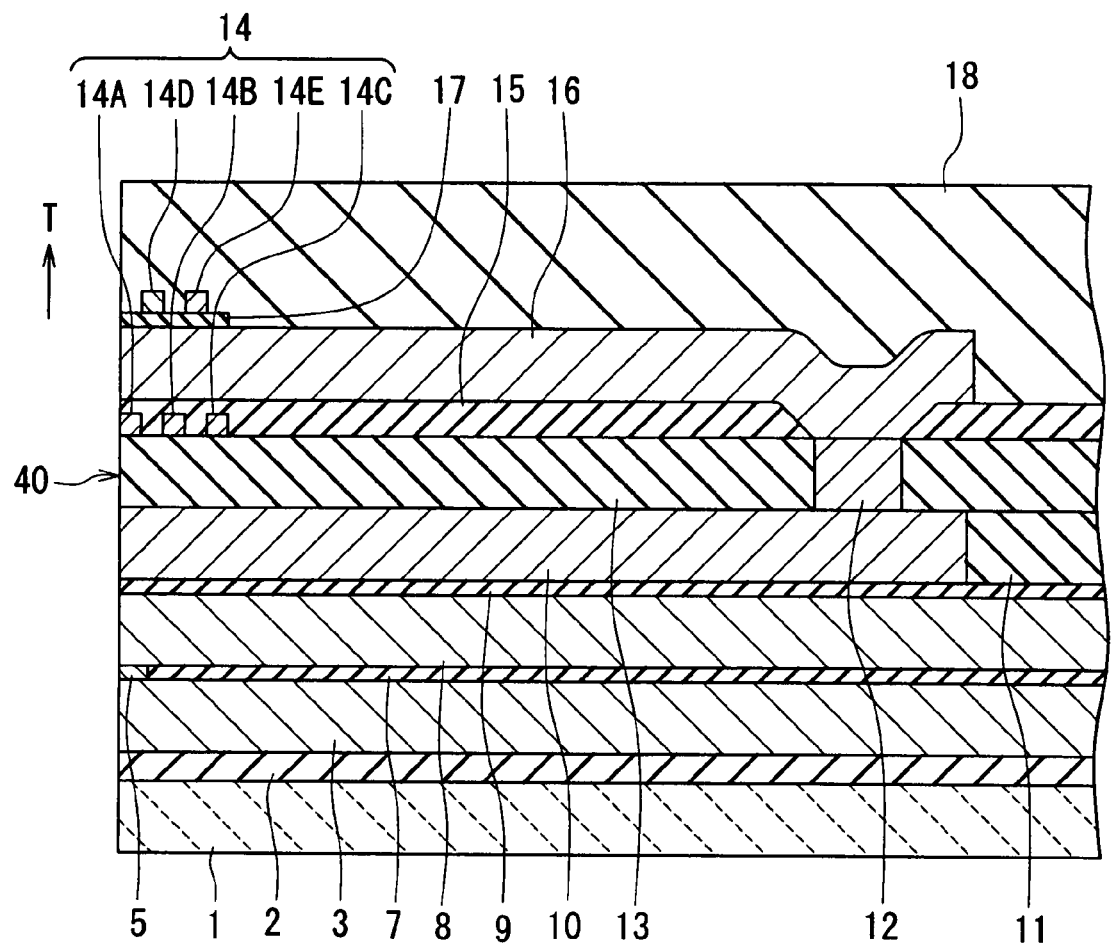
FIG. 18 is a cross-sectional view illustrating the configuration of a magnetic head of the third embodiment of the invention.

A third embodiment of the invention will now be described with reference to FIG. 17 and FIG. 18. FIG. 17 is a top view illustrating the pole layer and the coil of the third embodiment. FIG. 18 is a cross-sectional view illustrating the configuration of a magnetic head of the third embodiment. FIG. 18 illustrates a cross section orthogonal to the medium facing surface and the top surface of the substrate. In FIG. 18 the arrow marked with T shows the direction of travel of the recording medium.

In the third embodiment, the coil 14 includes coil elements 14A, 14B, 14C, 14D and 14E, in place of the coil elements 14a, 14b and 14c of the first embodiment. Furthermore, in the third embodiment, leads 14F and 14G are provided in place of the leads 14d and 14e of the first embodiment. The coil elements 14A, 14B, 14C, 14D and 14E and the leads 14F and 14G are made of a conductive material.

The coil elements 14A, 14B and 14C are disposed on the insulating layer 13 in a neighborhood of the medium facing surface 40. As shown in FIG. 17, each of the coil elements 14A, 14B and 14C has a shape that is long in one direction, and is disposed parallel to the medium facing surface 40. As shown in FIG. 18, the cross section of each of the coil elements 14A, 14B and 14C orthogonal to the longitudinal direction is rectangular. One of surfaces of the coil element 14A is located in the medium facing surface 40. The coil element 14B is disposed away from the medium facing surface 40 and parallel to the coil element 14A. The coil element 14C is disposed farther from the medium facing surface 40 than the coil element 14B, and is disposed parallel to the coil element 14B. A gap is formed between the coil elements 14A and 14B, and between the coil elements 14B and 14C.

As shown in FIG. 17, the coil element 14A has a first end 14A1 and a second end 14A2 located opposite to each other. Similarly, the coil element 14B has a first end 14B1 and a second end 14B2 located opposite to each other, and the coil element 14C has a first end 14C1 and a second end 14C2 located opposite to each other. The lead 14F is connected to the first end 14A1 of the coil element 14A, while the lead 14G is connected to the first end 14C1 of the coil element 14C. The coil element 14A and the lead 14F are different portions of a single layer made of a conductive material. Similarly, the coil element 14C and the lead 14G are different portions of another single layer made of a conductive material.

The coil elements 14A and 14B are disposed at positions the same as those at which the coil elements 14a and 14b of the first embodiment are disposed. The coil element 14C is disposed at a position that is below the flare portion 16B1 and near the boundary 16C between the track width defining portion 16A and the wide portion 16B. The insulating layer 15 is disposed to cover the coil elements 14A, 14B and 14C. The insulating layer 15 has: a first opening for exposing a portion of the top surface of the coil element 14A near the second end 14A2; a second opening for exposing a portion of the top surface of the coil element 14B near the first end 14B1; a third opening for exposing a portion of the top surface of the coil element 14B near the second end 14B2; and a fourth opening for exposing a portion of the top surface of the coil element 14C near the second end 14C2.

The coil elements 14D and 14E are disposed on the insulating layer 17. The coil element 14D has a first end 14D1 and a second end 14D2 located opposite to each other, and is disposed to extend over the track width defining portion 16A. A portion of the coil element 14D near the first end 14D1 is connected to the portion of the top surface of the coil element 14A near the second end 14A2 through the first opening of the insulating layer 15. In a neighborhood of the first end 14D1, a portion of the peripheral surface of the coil element 14D is located in the medium facing surface 40. A portion of the coil element 14D near the second end 14D2 is connected to the portion of the top surface of the coil element 14B near the first end 14B1 through the second opening of the insulating layer 15.

The coil element 14E has a first end 14E1 and a second end 14E2 located opposite to each other, and is disposed to extend over the track width defining portion 16A and the flare portion 16B1. A portion of the coil element 14E near the first end 14E1 is connected to the portion of the top surface of the coil element 14B near the second end 14B2 through the third opening of the insulating layer 15. A portion of the coil element 14E near the second end 14E2 is connected to the portion of the top surface of the coil element 14C near the second end 14C2 through the fourth opening of the insulating layer 15. As shown in FIG. 18, the cross section of each of the coil elements 14D and 14E orthogonal to the longitudinal direction is rectangular. A gap is formed between the coil elements 14D and 14E.

The coil 14 composed of the coil elements 14A, 14B, 14C, 14D and 14E is helically wound only around the track width defining portion 16A and the flare portion 16B1 of the pole layer 16. As shown in FIG. 17, the coil 14 has a portion located between the medium facing surface 40 and the two side surfaces 16B11, 16B12 of the flare portion 16B1. Furthermore, as shown in FIG. 17, the maximum outer diameter D of the coil 14 taken in the track width direction is equal to or smaller than the maximum width W of the wide portion 16B taken in the track width direction.

The coil 14 has portions located in the medium facing surface 40. To be specific, the portions of the coil 14 located in the medium facing surface 40 are one of the surfaces of the coil element 14A and part of the peripheral surface of the coil element 14D near the first end 14D1 of the coil element 14D.

In the embodiment, the line width of each of the coil elements 14A, 14B, 14C, 14D and 14E, that is, the dimension of each of these elements taken in the direction orthogonal to the medium facing surface 40, is within a range of 20 to 400 nm, for example. The thickness of each of the coil elements 14A, 14B, 14C, 14D and 14E, that is, the dimension of each of these elements taken in the direction orthogonal to the top surface of the substrate 1, is within a range of 20 to 1000 nm, for example. The gap between the coil elements 14A and 14B, the gap between the coil elements 14B and 14C, and the gap between the coil elements 14D and 14E are each within a range of 20 to 200 nm, for example.

The number of turns of the coil 14 of the third embodiment is greater than the number of turns of the coil 14 of the first embodiment. However, the coil 14 of the third embodiment can be formed by a method similar to the method of forming the coil 14 of the first embodiment.

In the embodiment, the coil 14 is helically wound only around the track width defining portion 16A and the flare portion 16B1 of the pole layer 16, and has a portion located between the medium facing surface 40 and the two side surfaces 16B11, 16B12 of the flare portion 16B1. In the embodiment, a greater part of the magnetic flux corresponding to the magnetic field generated by the coil 14 passes through the track width defining portion 16A located in the space surrounded by the coil 14. As a result, according to the embodiment, it is possible to improve write characteristics while suppressing the occurrence of problems resulting from flux leakage occurring in a portion of the medium facing surface 40 other than the end face of the pole layer 16. To be specific, according to the embodiment, it is possible to improve the overwrite property while suppressing adjacent track erase.

If the coil 14 were devoid of a portion located between the medium facing surface 40 and the side surfaces 16B11 and 16B12 of the flare portion 16B1, that is, if the minimum inner diameter of the coil 14 taken in the track width direction were equal to or greater than the maximum width W of the wide portion 16B taken in the track width direction, a greater part of the magnetic flux would leak from the side surfaces 16B11 and 16B12 of the flare portion 16B1 to the outside of the pole layer 16 and reach the medium facing surface 40. For this reason, it is required that the coil 14 have a portion located between the medium facing surface 40 and the side surfaces 16B11 and 16B12 of the flare portion 16B1.

The greater the maximum outer diameter D of the coil 14 taken in the track width direction, the more likely it is that there occurs a magnetic flux leaking from the side surfaces 16B11 and 16B12 of the flare portion 16B1 to the outside of the pole layer 16 and reaching the medium facing surface 40. Therefore, it is preferred that the maximum outer diameter D of the coil 14 taken in the track width direction be equal to or smaller than the maximum width W of the wide portion 16B, and the smaller the better.

The magnetic head of the third embodiment may include the protection film 20 for covering the medium facing surface 40, as in the second embodiment.

The remainder of configuration, function and effects of the third embodiment are similar to those of the first or the second embodiment.

Fourth Embodiment

Figure 19:
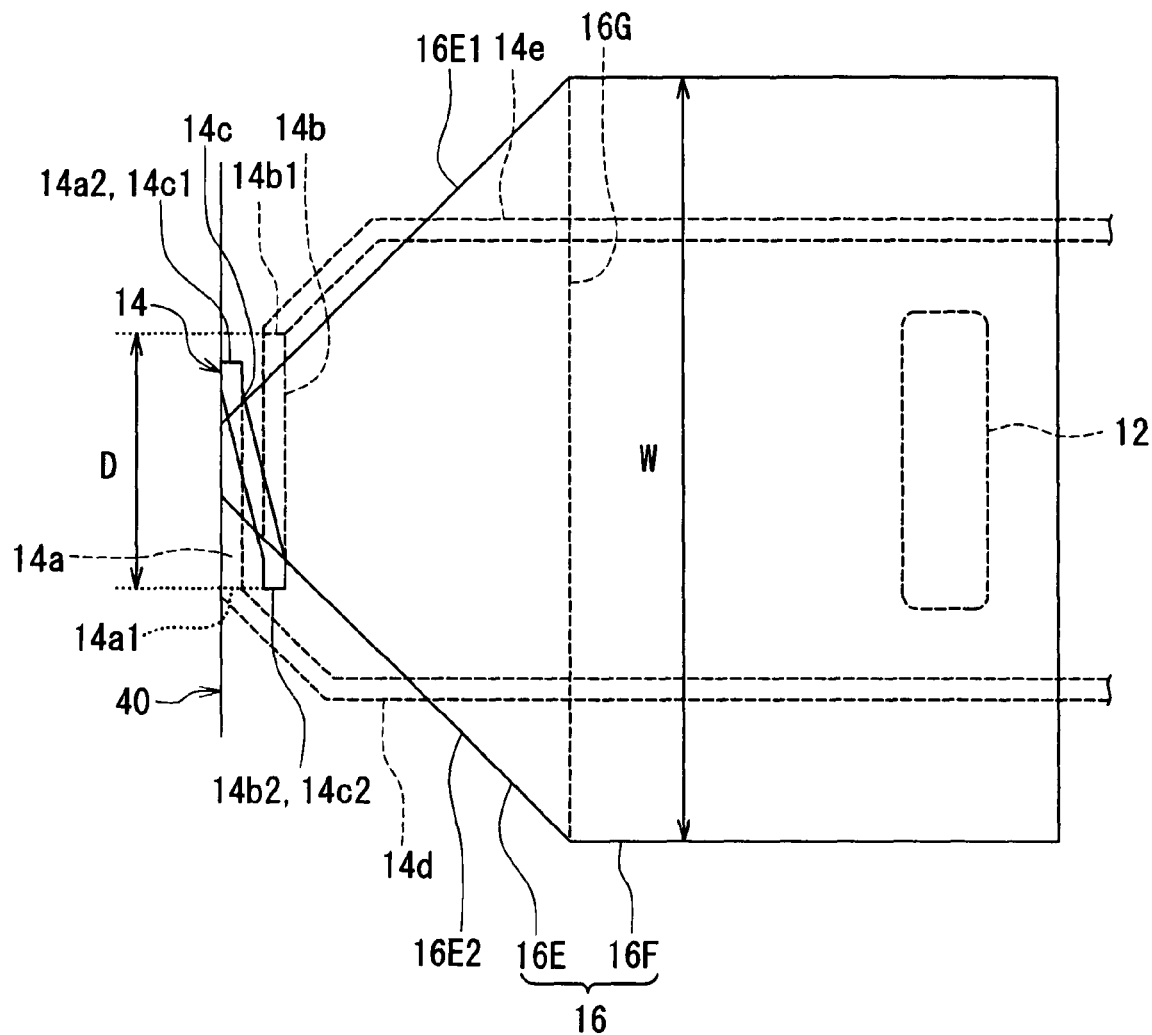
FIG. 19 is a top view illustrating a pole layer and a coil of a fourth embodiment of the invention.

A fourth embodiment of the invention will now be described with reference to FIG. 19. FIG. 19 is a top view illustrating the pole layer and the coil of the fourth embodiment. In this embodiment, the pole layer 16 does not have the track width defining portion 16A of the first embodiment. The pole layer 16 of this embodiment includes: a flare portion 16E having an end located in the medium facing surface 40 and having a width taken in the track width direction that increases with increasing distance from the medium facing surface 40; and a uniform width portion 16F located on a side of the flare portion 16E opposite to the medium facing surface 40. The width of the uniform width portion 16F taken in the track width direction is uniform. In addition, the width of the uniform width portion 16F taken in the track width direction is equal to the maximum width W of the pole layer 16 taken in the track width direction. In FIG. 19, the broken line marked with 16G indicates the boundary between the flare portion 16E and the uniform width portion 16F. At the position of this boundary 16G, the width of the flare portion 16E is equal to the width of the uniform width portion 16F. The end of the flare portion 16E located in the medium facing surface 40 defines the track width. The flare portion 16E has two side surfaces 16E1 and 16E2 located on opposite sides in the track width direction.

In the fourth embodiment the coil 14 is composed of the coil elements 14a, 14b and 14c, as in the first embodiment. However, the coil 14 of the fourth embodiment is helically wound only around the flare portion 16E of the pole layer 16, and has a portion located between the medium facing surface 40 and the two side surfaces 16E1, 16E2 of the flare portion 16E. The maximum outer diameter D of the coil 14 taken in the track width direction is equal to or smaller than the maximum width W of the pole layer 16 taken in the track width direction.

The coil 14 has portions located in the medium facing surface 40. To be specific, the portions of the coil 14 located in the medium facing surface 40 are one of the surfaces of the coil element 14a and part of the peripheral surface of the coil element 14c near the first end 14c1 of the coil element 14c.

In the embodiment, the line width of each of the coil elements 14a, 14b and 14c, that is, the dimension of each of these elements taken in the direction orthogonal to the medium facing surface 40, is within a range of 20 to 400 nm, for example. The thickness of each of the coil elements 14a, 14b and 14c, that is, the dimension of each of these elements taken in the direction orthogonal to the top surface of the substrate 1, is within a range of 20 to 1000 nm, for example. The gap between the coil elements 14a and 14b is within a range of 20 to 200 nm, for example.

In the embodiment, the coil 14 is helically wound only around the flare portion 16E of the pole layer 16, and has a portion located between the medium facing surface 40 and the two side surfaces 16E1, 16E2 of the flare portion 16E. In the embodiment, a greater part of the magnetic flux corresponding to the magnetic field generated by the coil 14 passes through a portion of the flare portion 16E located in the space surrounded by the coil 14. As a result, according to the embodiment, it is possible to improve write characteristics while suppressing the occurrence of problems resulting from flux leakage occurring in a portion of the medium facing surface 40 other than the end face of the pole layer 16. To be specific, according to the embodiment, it is possible to improve the overwrite property while suppressing adjacent track erase.

If the coil 14 were devoid of a portion located between the medium facing surface 40 and the side surfaces 16E1, 16E2 of the flare portion 16E, that is, if the minimum inner diameter of the coil 14 taken in the track width direction were equal to or greater than the maximum width W of the pole layer 16 taken in the track width direction, a greater part of the magnetic flux would leak from the side surfaces 16E1 and 16E2 of the flare portion 16E to the outside of the pole layer 16 and reach the medium facing surface 40. For this reason, it is required that the coil 14 have a portion located between the medium facing surface 40 and the side surfaces 16E1, 16E2 of the flare portion 16E.

The greater the maximum outer diameter D of the coil 14 taken in the track width direction, the more likely it is that there occurs a magnetic flux leaking from the side surfaces 16E1 and 16E2 of the flare portion 16E to the outside of the pole layer 16 and reaching the medium facing surface 40. Therefore, it is preferred that the maximum outer diameter D of the coil 14 taken in the track width direction be equal to or smaller than the maximum width W of the pole layer 16, and the smaller the better.

The magnetic head of the fourth embodiment may include the protection film 20 for covering the medium facing surface 40, as in the second embodiment.

The remainder of configuration, function and effects of the fourth embodiment are similar to those of the first or the second embodiment.

The present invention is not limited to the foregoing embodiments but various modifications are possible. For example, in the present invention, the number of turns of the coil 14 may be increased by making the number of the coil elements greater than that disclosed in any of the embodiments. Alternatively, the coil 14 may comprise one turn. Furthermore, the coil 14 may be devoid of a portion located in the medium facing surface 40.

While the embodiments have been described with reference to a magnetic head having a structure in which the read head is formed on the base body and the write head is stacked on the read head, the read and the write head may be stacked in the reverse order.

It is apparent that the present invention can be carried out in various forms and modifications in the light of the foregoing descriptions. Accordingly, within the scope of the following claims and equivalents thereof, the present invention can be carried out in forms other than the foregoing most preferable embodiment.

What is claimed is:

1. A magnetic head for perpendicular magnetic recording comprising:
    a medium facing surface that faces toward a recording medium;
    a coil that generates a magnetic field corresponding to data to be written on the recording medium; and
    a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system, wherein:
    the pole layer includes: a track width defining portion having a first end located in the medium facing surface and a second end opposite to the first end; and a wide portion connected to the second end;
    the first end defines a track width;
    the track width defining portion has a width taken in a track width direction;
    the wide portion has a width taken in the track width direction that is greater than the width of the track width defining portion taken in the track width direction;
    the wide portion includes a flare portion having an end connected to the second end and having a width taken in track width direction that increases with increasing distance from the medium facing surface;
    the flare portion has two side surfaces located on opposite sides in the track width direction; and
    the coil is helically wound only around the track width defining portion and the flare portion of the pole layer, and has a portion located between the medium facing surface and the two side surfaces of the flare portion.

2. The magnetic head for perpendicular magnetic recording according to claim 1, wherein a maximum outer diameter of the coil taken in the track width direction is equal to or smaller than a maximum width of the wide portion taken in the track width direction.

3. The magnetic head for perpendicular magnetic recording according to claim 1, wherein the coil has a portion located in the medium facing surface.

4. The magnetic head for perpendicular magnetic recording according to claim 1, further comprising a protection film for protecting the medium facing surface.

5. A head assembly comprising: a slider including a magnetic head for perpendicular magnetic recording and disposed to face toward a recording medium; and a supporter flexibly supporting the slider,
    the magnetic head comprising:
    a medium facing surface that faces toward the recording medium;
    a coil that generates a magnetic field corresponding to data to be written on the recording medium; and
    a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system, wherein:
    the pole layer includes: a track width defining portion having a first end located in the medium facing surface and a second end opposite to the first end; and a wide portion connected to the second end;
    the first end defines a track width;
    the track width defining portion has a width taken in a track width direction;
    the wide portion has a width taken in the track width direction that is greater than the width of the track width defining portion taken in the track width direction;
    the wide portion includes a flare portion having an end connected to the second end and having a width taken in track width direction that increases with increasing distance from the medium facing surface;
    the flare portion has two side surfaces located on opposite sides in the track width direction; and
    the coil is helically wound only around the track width defining portion and the flare portion of the pole layer, and has a portion located between the medium facing surface and the two side surfaces of the flare portion.

6. A magnetic disk drive comprising: a slider including a magnetic head for perpendicular magnetic recording and disposed to face toward a recording medium that is driven to rotate; and an alignment device supporting the slider and aligning the slider with respect to the recording medium,
    the magnetic head comprising:
    a medium facing surface that faces toward the recording medium;
    a coil that generates a magnetic field corresponding to data to be written on the recording medium; and
    a pole layer that has an end face located in the medium facing surface, allows a magnetic flux corresponding to the magnetic field generated by the coil to pass therethrough and generates a write magnetic field for writing the data on the recording medium by means of a perpendicular magnetic recording system, wherein:
    the pole layer includes: a track width defining portion having a first end located in the medium facing surface and a second end opposite to the first end; and a wide portion connected to the second end;
    the first end defines a track width;
    the track width defining portion has a width taken in a track width direction;
    the wide portion has a width taken in the track width direction that is greater than the width of the track width defining portion taken in the track width direction;
    the wide portion includes a flare portion having an end connected to the second end and having a width taken in track width direction that increases with increasing distance from the medium facing surface;
    the flare portion has two side surfaces located on opposite sides in the track width direction; and
    the coil is helically wound only around the track width defining portion and the flare portion of the pole layer, and has a portion located between the medium facing surface and the two side surfaces of the flare portion.

* * * * *